US011521227B2

(12) United States Patent
Agrawal et al.

(10) Patent No.: US 11,521,227 B2
(45) Date of Patent: Dec. 6, 2022

(54) METHOD AND SYSTEM FOR CREDITING ACCOUNT

(71) Applicant: MASTERCARD INTERNATIONAL INCORPORATED, Purchase, NY (US)

(72) Inventors: Rahul Agrawal, Pune (IN); Harsh Piparsaniya, Pune (IN); Sudhir Gupta, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/411,094

(22) Filed: May 13, 2019

(65) Prior Publication Data

US 2019/0392474 A1 Dec. 26, 2019

(30) Foreign Application Priority Data

Jun. 26, 2018 (SG) .......................... 10201805515Q

(51) Int. Cl.
*G06Q 30/02* (2012.01)

(52) U.S. Cl.
CPC ..... *G06Q 30/0233* (2013.01); *G06Q 30/0215* (2013.01); *G06Q 30/0236* (2013.01)

(58) Field of Classification Search
None
See application file for complete search history.

(56) References Cited

U.S. PATENT DOCUMENTS

| 2005/0021457 | A1* | 1/2005 | Johnson | G06Q 20/10 705/39 |
| 2006/0004650 | A1* | 1/2006 | Mittenzwei | G06Q 40/02 705/38 |
| 2007/0239523 | A1* | 10/2007 | Yi | G06Q 30/0241 705/14.1 |
| 2012/0010937 | A1 | 1/2012 | Hanson et al. | |
| 2014/0100939 | A1* | 4/2014 | Postrel | G06Q 30/0239 705/14.33 |

OTHER PUBLICATIONS

Kumar et al., "Building and sustaining profitable customer loyalty for the 21st century," Journal of Retailing 80 (2004) pp. 317-330. (Year: 2004).*
Kumar, P., "Examination Report", corresponding to Indian Application No. 201914014904, dated Feb. 5, 2021, 7 pages.

* cited by examiner

*Primary Examiner* — Christopher B Tokarczyk

(57) ABSTRACT

A method and system for crediting a financial account of a user with an amount is provided. The amount is maintained in a lock mode for a set time period in the account. The crediting of the amount is based on a registration request received from the user. The user further provides the amount that the user wants to maintain in the account. Reward points are determined based on transaction history of a transaction card associated with the account and are blocked in the account based on the registration request. The reward points are settled as and when the user performs transactions in the set time period by way of the transaction card. The amount that is equivalent to the reward points is credited in the account of the user when the reward points are settled in the set time period.

20 Claims, 21 Drawing Sheets

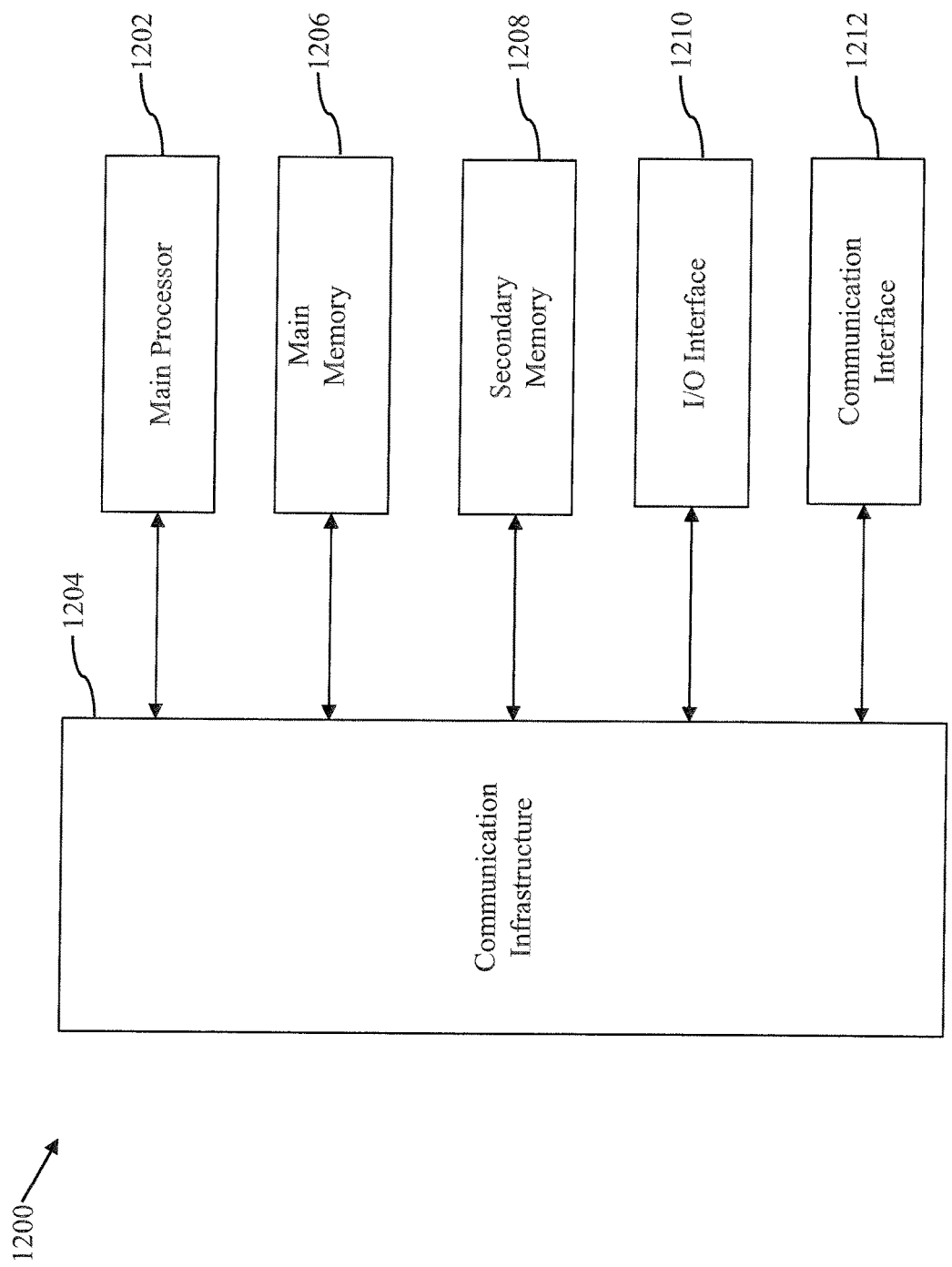

METHOD AND SYSTEM FOR CREDITING ACCOUNT

CROSS REFERENCE TO RELATED APPLICATION

This application is related to and claims priority from Singapore Application No. 10201805515Q, filed Jun. 26, 2018, entitled "Method and System for Crediting Account", the entirety of which is incorporated herein by reference.

FIELD OF THE INVENTION

The present invention relates generally to account management, and more particularly, to a method for crediting an account of a user.

BACKGROUND

Financial institutions such as banks have witnessed tremendous growth in the past decade due to advent of smartphones and an increase in the number of people opting for multiple bank accounts. Banks typically require users to maintain a minimum amount in their bank account to keep the account active. The minimum amount has to be maintained on a daily, monthly, or quarterly basis depending on the type of account. When an amount in the user's bank account drops below the minimum amount, a maintenance fee is levied on the user's account, often without prior intimation. Banks may avail the fee by deducting a predetermined amount from the user's account or informing the user to pay the fee if the user's account does not have the predetermined amount.

In order that the bank does not levy the maintenance fee, the user has to ensure that the amount in the user's account does not drop below the minimum amount. Thus, it becomes very inconvenient for the user as the user needs to constantly check bank statements to ensure that the minimum amount is maintained. In one scenario, the user may end up using the entire amount from her account and thus fail to maintain the minimum amount. In such scenario, the bank keeps deducting the maintenance fee from the user's account on a monthly or quarterly basis until the minimum amount is maintained, thereby causing monetary loss to the user. In addition, if the user does not check the bank statements or perform any transactions from her account for a significant time period, she may be unaware of the maintenance fee that is being charged by the bank on a monthly or quarterly basis. This further causes significant monetary loss to the user. Further, if the user fails to pay the maintenance fee, the bank might terminate the user's account. In another scenario, the user may have multiple accounts within a bank or with multiple banks. Hence, it becomes very difficult for the user to remember the maintenance of the minimum amount in each account. To remember if the minimum amount is maintained in each account, the user might prefer relying on bank messages on the user's mobile phone or smartphone. However, a bank may not send the bank messages for every transaction that is performed from the user's account.

Certain banks offer a facility of keeping the bank account active after the amount in the user's account drops below the minimum amount by having the user conduct transactions of a fixed amount within a determined time period. A disadvantage with this facility is that the user at that point in time may not want to conduct those transactions. Certain banks offer another facility of not maintaining any minimum amount in the user's account. However, such banks impose certain restrictions on the user's account that are related to setting a limit on the maximum amount in the user's account or total withdrawals or transfers of an amount not exceeding a predetermined monthly limit in the user's account. Having accounts in such banks thus becomes inconvenient to the user as the user cannot use the account to deposit money more than the maximum amount decided by the bank or perform withdrawals or transfers of a higher amount.

In light of the foregoing, there exists a need for a solution that facilitates maintaining a minimum amount in the user's account, without causing any inconvenience to the user.

SUMMARY

In an embodiment of the present invention, a method for crediting a user account is provided. A verification of the user account of a user is initiated by a server based on a registration request raised by the user. The server is one of a payment network server or an issuer server. Information pertaining to a first amount is received by the server based on the verification of the user account. First reward points associated with the user account are determined by the server based on at least one of the first amount and a transaction card associated with the user account. First block request to block the first reward points from the user account is initiated by the server. The blocked first reward points are settled against one or more reward points earned by the user when the user performs one or more transactions by way of the transaction card. A credit of the first amount is initiated by the server in a lock mode in the user account based on the first reward points. The first amount is credited in the user account for a first time period.

In another embodiment of the present invention, a system for crediting a user account is provided. The system includes a server that further includes a processor. The processor is configured to initiate a verification of the user account of a user based on a registration request raised by the user. The processor is further configured to receive information pertaining to a first amount based on the verification of the user account. The processor is further configured to determine first reward points associated with the user account. The first reward points are determined based on at least one of the first amount and a transaction card associated with the user account. The processor is further configured to initiate a first block request to block the first reward points from the user account. The blocked first reward points are settled against one or more reward points earned by the user when the user performs one or more transactions by way of the transaction card. The processor is further configured to initiate a credit of the first amount in a lock mode in the user account based on the first reward points. The first amount is credited in the user account for a first time period.

In yet another embodiment of the present invention, a method for crediting a user account is provided. A verification of the user account of a user is initiated by a payment network server based on a registration request raised by the user. Information pertaining to a first amount based on the verification of the user account is received by the payment network server. First reward points associated with the user account are determined by the payment network server based on at least one of the first amount and a transaction card associated with the user account. A first block request to block the first reward points from the user account is transmitted by the payment network server to the issuer server. The blocked first reward points are settled against one or more reward points earned by the user when the user performs one or more transactions by way of the transaction card. A credit request to credit the first amount in a lock mode in the user account based on the first reward points is transmitted by the payment network server to the issuer server. The first amount is credited in the user account for a first time period.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIG. 12 is a block diagram that illustrates a system architecture of a computer system, in accordance with an embodiment of the present invention.

Figure 1:
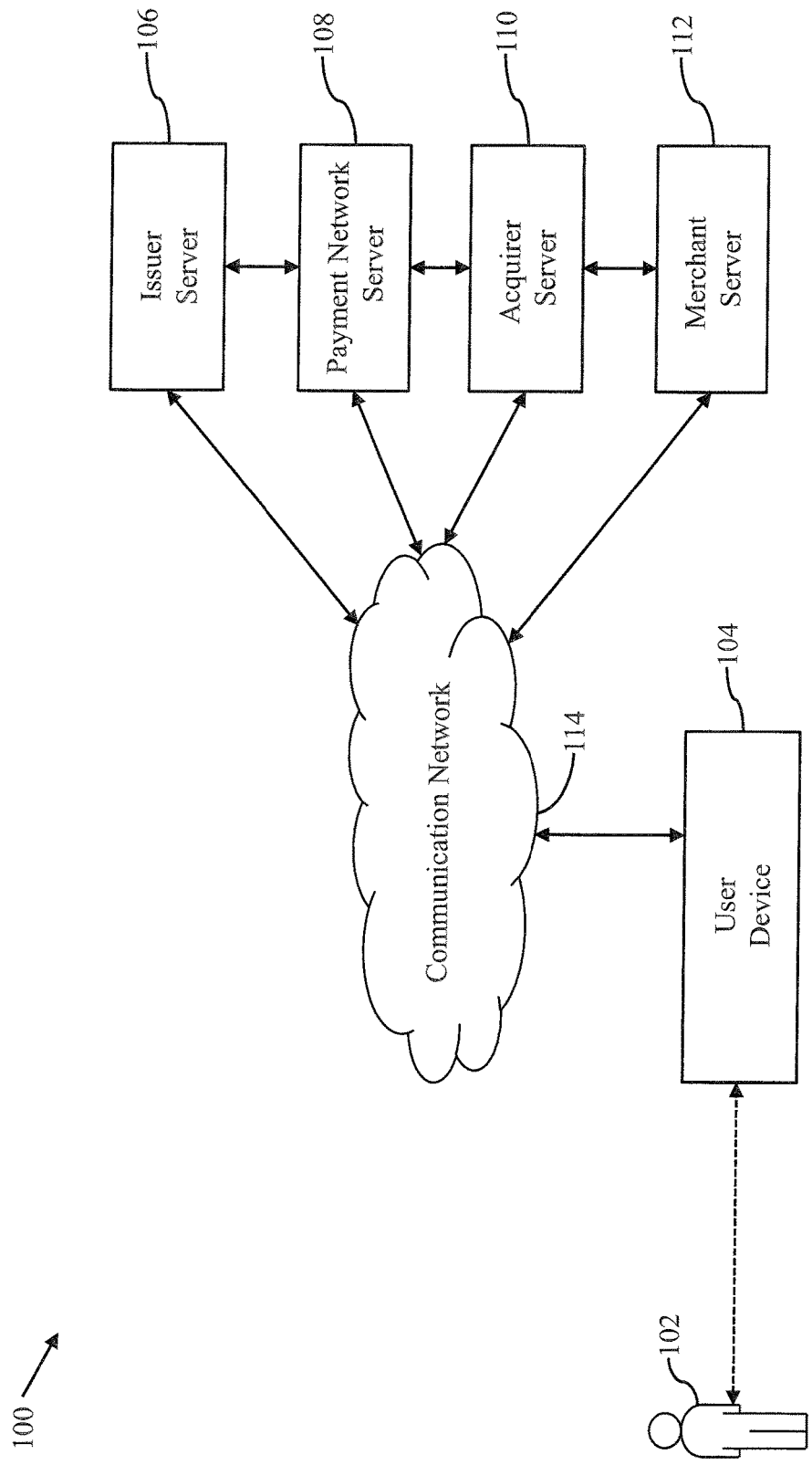
FIG. 1 is a block diagram that illustrates a communication environment for crediting an account of a user, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

OVERVIEW

Various embodiments of the present invention provide a method and a system for crediting a user account. A user raises a registration request by way of a user device for registering with a service that maintains a minimum amount in the user account. The registration request is received by a server. The server may be a payment network server or an issuer server. The server initiates a verification of the user account by transmitting a verification request to the user device and receives information pertaining to a first amount in response to the verification request. The first amount may correspond to a minimum amount that the user has to maintain in the user account. The server determines first reward points based on the first amount and by retrieving a transaction history of the user account. The server further determines whether the user is likely to settle the first reward points by performing as many transactions. Based on the determination, the server communicates the blocking of the first reward points and the locking of the first amount corresponding to the first reward points to the user. The user provides an acceptance or a decline to the blocking of the first reward points and communicates the acceptance or decline by way of a first input. The server receives the first input and initiates a first block request to block the first reward points from the user account. The user is able to settle the blocked first reward points against one or more reward points which the user earns when the user performs one or more transactions by way of a transaction card. The server further initiates a credit of the first amount in a lock mode in the user account based on the first reward points for a first time period.

When the user performs a transaction to settle the reward points, the server determines if the transaction has been performed within the first time period. If the server determines that the transaction was performed within the first time period, the server determines second reward points corresponding to the transaction. The server initiates a second block request to release the second reward points and block a difference of the first and second reward points from the user account. When the user settles all the first reward points, the server initiates an unlock request to unlock the first amount from the user account. In an event the user does not settle the first reward points within the first time period, the server initiates a debit request to debit the first amount from the user account. The server may further determine time intervals for the user to settle predetermined points of the first reward points. The server debits the first amount when the user is unable to settle the predetermined points.

Thus, the method and the system, in accordance with various embodiments of the present invention, provide a facility to maintain a minimum amount in the user account without causing much inconvenience to the user.

Terms Description (in Addition to Plain and Dictionary Meaning)

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to a merchant server, a payment gateway server, a digital wallet server, an acquirer server, a payment network server, or an issuer server.

Merchant is an entity that offers various products and/or services in exchange of payments. The merchant may establish a merchant account with a financial institution, such as a bank (hereinafter "acquirer bank") to accept the payments from several users.

Issuer bank is a financial institution, such as a bank, where accounts of several users are established and maintained. The issuer bank ensures payment for authorized transactions in accordance with various payment network regulations and local legislation.

Payment networks are transaction card associations that act as intermediate entities between acquirer banks and issuer banks to authorize and fund transactions. Examples of various payment networks include MasterCard®, American Express®, VISA®, Discover®, Diners Club®, and the like. Payment networks settle transactions between various acquirer banks and issuer banks when transaction cards are used for initiating the transactions. The payment network ensures that a transaction card used by a user for initiating a transaction is authorized. The payment network further provides a facility for the user to maintain a minimum amount in the user's account.

Transaction cards refer to cards, such as debit cards, credit cards, prepaid cards, gift cards, promotional cards, and/or other devices, such as contactless fobs or payment-enabled mobile devices, that may hold identification information of an account. Transaction cards can be used to perform transactions, such as deposits and withdrawals, credit transfers, purchase payments, and the like. A transaction card may also be radio frequency identification (RFID) or near field communication (NFC) enabled for contactless payments.

Reward points are incentives offered to users as part of rewards programs, loyalty programs, or incentive programs. The rewards program is a scheme maintained by a merchant, a payment network, or an issuer bank to attract and retain the users. The rewards program involves assigning reward points to a user when the user performs a transaction to purchase a product. The rewards program further involves associating monetary or non-monetary benefits with the reward points. Such benefits are awarded to the user when the user performs transactions to redeem the reward points.

Cashback facility is a monetary benefit provided to the user as part of the rewards program. When the user purchases a product and earns reward points associated with the purchase, the user may avail the benefits associated with the reward points. The user can thus contact the financial institution for redeeming the reward points to avail the benefits. The financial institution credits cash equivalent of the reward points in the user's account.

Minimum amount or reserve requirement is a minimum account balance that is to be maintained in the user's account to avoid maintenance fees or penalty getting charged on the account. The minimum amount has to be maintained on a daily, monthly, or quarterly basis depending on the financial institution and the type of account. The financial institution pre-determines the maintenance fees for the account and charges the maintenance fees when the amount in the user's account drops below the minimum amount.

Block request is a request initiated by the issuer bank or the payment network to block the reward points associated with the account. When the financial institution receives the block request, the financial institution blocks the benefits associated with the reward points and does not offer the benefits to the user for a determined time period.

Referring now to FIG. 1, a block diagram that illustrates a communication environment 100 for crediting an account of a user 102, in accordance with an embodiment of the present invention, is shown. The communication environment 100 includes the user 102 in possession of a user device 104. The communication environment 100 further includes an issuer server 106, a payment network server 108, an acquirer server 110, and a merchant server 112. The user device 104 communicates with the issuer server 106, the payment network server 108, and the merchant server 112 by way of a communication network 114.

The user 102 is an individual, who is an account holder of the account. In one embodiment, the account is a bank account maintained by a financial institution, such as an issuer bank. In another embodiment, the account is a digital wallet maintained by a third-party service provider or a merchant. The account is linked to various transaction cards. Each transaction card stores identification information of the account (hereinafter referred to as "account identification information of the account"). The account identification information may be stored in the form of an electronic chip or a machine readable magnetic strip embedded in each transaction card. The account identification information may include an account number of the account, a name of an account holder (i.e., the user 102), or the like. Each transaction card has a unique card number, an expiry date, a card security code, and a card type associated to it. The card number, the expiry date, the card security code, and the card type constitute transaction card details of the corresponding transaction card. In one embodiment, the transaction cards are physical cards. In another embodiment, the transaction cards are virtual cards that are stored electronically in a memory (not shown) of the user device 104. Examples of the transaction cards include credit cards, debit cards, membership cards, promotional cards, charge cards, prepaid cards, gift cards, or the like. If the account is a digital wallet, the account identification information is stored in a memory or a cloud server of the third-party service provider or the merchant.

The user device 104 is a communication device of the user 102. The user 102 uses the user device 104 to access a mobile application or a website of the issuer server 106, the payment network server 108, or the merchant server 112. The mobile application may be installed in the memory of the user device 104. Examples of the user device 104 include, but are not limited to, a mobile phone, a smartphone, a laptop, a tablet, a phablet, a desktop computer, a personal digital assistant, or any other communication device.

The issuer server 106 is a computing server that is associated with the issuer bank. The issuer bank is a financial institution that manages accounts of multiple users. Account details of the accounts established with the issuer bank are stored in user profiles of the users in a memory of the issuer server 106 or on a cloud server associated with the issuer server 106. The account details may include an account balance, a credit line, details of an account holder, transaction history of the account holder, account identification information, or the like. The details of the account holder may include name, age, gender, physical attributes, registered contact number, alternate contact number, registered e-mail address, or the like of the account holder.

The issuer server 106 receives various credit and debit requests from the payment network server 108 or the acquirer server 110. Based on the credit and debit requests, the issuer server 106 credits or debits the accounts of the users (also referred to as user accounts). The issuer server 106 further determines whether a minimum amount is maintained in the accounts of the users. The issuer server 106 debits a maintenance fee from an account if it determines that the minimum amount is not maintained in the corresponding account. Methods for crediting and debiting accounts via the issuer server 106 will be apparent to persons having skill in the art and may include processing via the traditional four-party system or the traditional three-party system. In one embodiment, the issuer server 106 further facilitates a maintenance of the minimum amount in the account of the user 102. The components and functioning of the issuer server 106 are explained in conjunction with FIGS. 3, 4, and 5.

The payment network server 108 is a computing server that is associated with a payment network of various transaction cards. The payment network server 108 represents an intermediate entity between the issuer server 106 and the acquirer server 110 for authorizing and funding the transactions performed by using the transaction cards. The payment network server 108 generates credit and/or debit requests based on the transactions performed by the users, such as the user 102. The credit and/or debit requests are communicated to the acquirer and issuer servers (for example, the acquirer server 110 and the issuer server 106) for crediting and/or debiting the accounts corresponding to the transactions. The payment network server 108 determines reward points for each transaction that the user performs by way of the transaction card. The transaction card may have an associated cashback facility which enables the user 102 to earn cash on settling the reward points. The payment network server 108 may facilitate the maintenance of the minimum amount in the user's account. The components and functioning of the payment network server 108 are explained in conjunction with FIGS. 2 and 4. Examples of various payment networks include MasterCard, American Express, VISA, Discover, Diners Club, or the like.

The acquirer server 110 is a computing server that is associated with a financial institution, such as an acquirer bank. The acquirer bank maintains a merchant account that is associated with the merchant server 112. The acquirer bank processes various transactions by using the acquirer server 110. The acquirer server 110 transmits transaction requests to the payment network server 108 or the issuer server 106, via the communication network 114. The acquirer server 110 credits or debits the merchant account in the acquirer bank based on the processing of the transactions that correspond to the merchant account.

The merchant server 112 is a computing server that is associated with a merchant. The merchant may establish the merchant account with the acquirer bank, to accept payments for products and/or services purchased and/or availed by various users. The merchant server 112 further maintains a purchase history of each user. The purchase history of a user represents details of all previous purchases made by the user. For example, the purchase history of the user 102 maintained by the merchant server 112 represents details of all previous purchases performed by the user 102 from the merchant. The details of a purchase may include a purchase order identifier (ID), a purchase amount, and a purchase date. The purchase order ID is a unique identifier assigned to each purchase. The purchase amount represents the amount which the user 102 had paid during the purchase. The purchase date represents the date on which the user 102 performed the purchase. The details of the purchase may further include an indicator that indicates whether the user 102 had used the same transaction card or a different transaction card for each purchase. The merchant server 112 may further assign reward points to the user 102 when the user 102 performs substantial transactions at the merchant.

Examples of the issuer server 106, the payment network server 108, the acquirer server 110, and the merchant server 112, include, but are not limited to, computers, laptops, mini-computers, mainframe computers, any non-transient and tangible machines that can execute a machine-readable code, cloud-based servers, distributed server networks, or a network of computer systems.

The communication network 114 is a medium through which content and messages are transmitted between various entities, such as the user device 104, the issuer server 106, the payment network server 108, the acquirer server 110, and the merchant server 112. Examples of the communication network 114 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the communication environment 100 may connect to the communication network 114 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G) communication protocols, Long Term Evolution (LTE) communication protocols, or any combination thereof.

Figure 2:
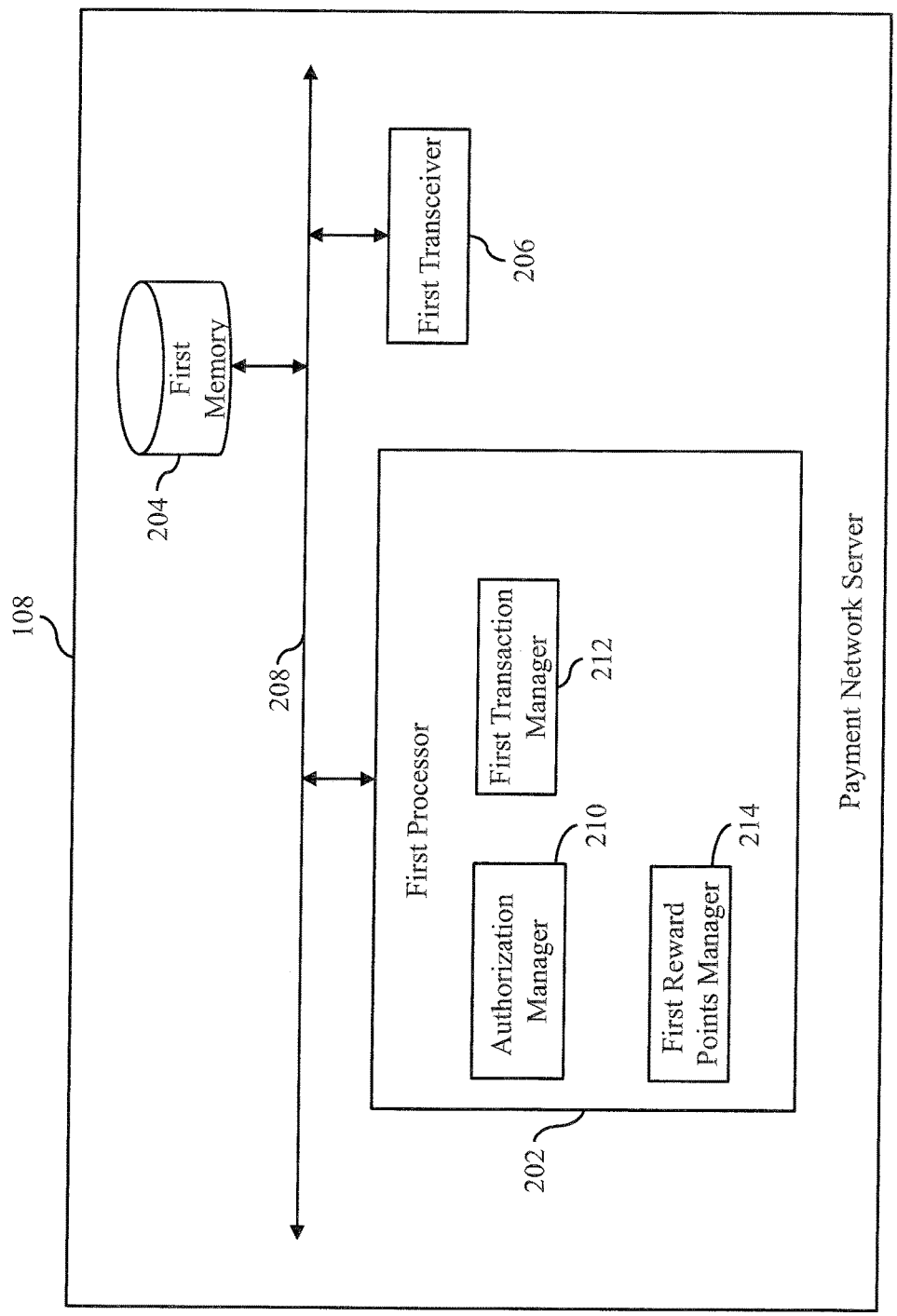
FIG. 2 is a block diagram that illustrates a payment network server of the communication environment of FIG. 1, in accordance with an embodiment of the present invention.

Referring now to FIG. 2, a block diagram that illustrates the payment network server 108 of the communication environment 100 of FIG. 1, in accordance with an embodiment of the present invention, is shown. The payment network server 108 includes a first processor 202, a first memory 204, and a first transceiver 206 that communicate with each other via a first bus 208. The first processor 202 includes an authorization manager 210, a first transaction manager 212, and a first reward points manager 214.

The first processor 202 includes suitable logic, circuitry, and/or interfaces to execute operations for initiating a credit or debit of an amount in the account and handling various requests that are received from one or more entities, such as the user device 104, the issuer server 106, the acquirer server 110, and the merchant server 112. Examples of the first processor 202 include, but are not limited to, an application-specific integrated circuit (ASIC) processor, a reduced instruction set computing (RISC) processor, a complex instruction set computing (CISC) processor, a field-programmable gate array (FPGA), and the like.

The first memory 204 includes suitable logic, circuitry, and/or interfaces to store user profiles of multiple users. A user profile of a user may include registered contact information, login details (such as a login-id and a password), and account identification information of the user. The first memory 204 further stores a set of computer readable instructions for hosting a mobile application on the user device 104. Examples of the first memory 204 include a random-access memory (RAM), a read-only memory (ROM), a removable storage drive, a hard disk drive (HDD), and the like. It will be apparent to a person skilled in the art that the scope of the invention is not limited to realizing the first memory 204 in the payment network server 108, as described herein. In another embodiment, the first memory 204 may be realized in the form of a database server or a cloud storage working in conjunction with the payment network server 108, without departing from the scope of the invention.

The first transceiver 206 transmits and receives data over the communication network 114 via one or more communication network protocols. The first transceiver 206 transmits/receives various requests and messages to/from at least one of the user device 104, the issuer server 106, the merchant server 112, the acquirer server 110, or other entities that are pursuant to one or more standards for the interchange of transaction messages, such as the ISO8583 standard. Examples of the first transceiver 206 include, but are not limited to, an antenna, a radio frequency transceiver, a wireless transceiver, a Bluetooth transceiver, an ethernet port, a universal serial bus (USB) port, or any other device configured to transmit and receive data.

The authorization manager 210 includes suitable logic and/or interfaces for authorizing various transactions performed by the user 102 by way of the transaction cards. The authorization manager 210 receives authorization requests from at least one of the issuer server 106 or the acquirer server 110 for authorizing the transactions. Each authorization request includes the transaction card details of the transaction card used for performing the corresponding transaction. Thus, based on an authorization request if the authorization manager 210 determines that the transaction card details match the transaction card details that are stored in the first memory 204, the authorization manager 210 authorizes the transaction for further processing. The authorization manager 210 further authorizes the user 102, when the user 102 accesses the mobile application or the webpage hosted by the payment network server 108 on the user device 104. For example, when the user 102 accesses the mobile application or the webpage and provides the login details, the authorization manager 210 compares the login details provided by the user 102 with the login details included in the user profile of the user 102 which is stored in the first memory 204. In a scenario, if the authorization manager 210 determines that the login details provided by the user 102 match the login details included in the user profile of the user 102, the authorization manager 210 authorizes the user 102.

In an alternate scenario, if the authorization manager 210 determines that the login details entered by the user 102 do not match the login details included in the user profile of the user 102, the authorization manager 210 does not authorize the user 102. The authorization manager 210 performs authorization by implementing various authorization techniques known in the art.

The first transaction manager 212 includes suitable logic and/or interfaces for initiating transactions, based on the authorization of the transactions. For example, if the authorization manager 210 authorizes a transaction, the first transaction manager 212 initiates the transaction by transmitting a debit or credit request to the issuer server 106 for debiting or crediting a transaction amount associated with the transaction from/to the account, else the transaction is not initiated. In one embodiment, the first transaction manager 212 further initiates and transmits a credit or debit request to the issuer server 106 for crediting or debiting an amount in the user's account with the minimum amount.

The first reward points manager 214 includes suitable logic and/or interfaces for determining reward points associated with each transaction. The first reward points manager 214 may further associate monetary or non-monetary benefits with the reward points. The monetary benefits may include a cashback facility for crediting cash that is equivalent to the redeemed reward points. The non-monetary benefits may include offering gifts in the form of merchandise, concession in fees during flight travel, concession on hotel booking, or the like. The first reward points manager 214 further maintains a reward points database for each user in the first memory 204 and updates the database as and when the users, such as the user 102, perform transactions to earn the reward points. The first reward points manager 214 further determines the reward points equivalent to an amount provided by the user 102 or the issuer server 106 for maintaining the minimum amount in the user account. The first reward points manager 214 further initiates and transmits a block request to the issuer server 106 for blocking the reward points associated with the account of the user 102 for a determined time period. The first reward points manager 214 further determines time intervals to settle the reward points. The functions performed by the authorization manager 210, the first transaction manager 212, and the first reward points manager 214 are explained in conjunction with FIGS. 4A and 4B.

Figure 3:
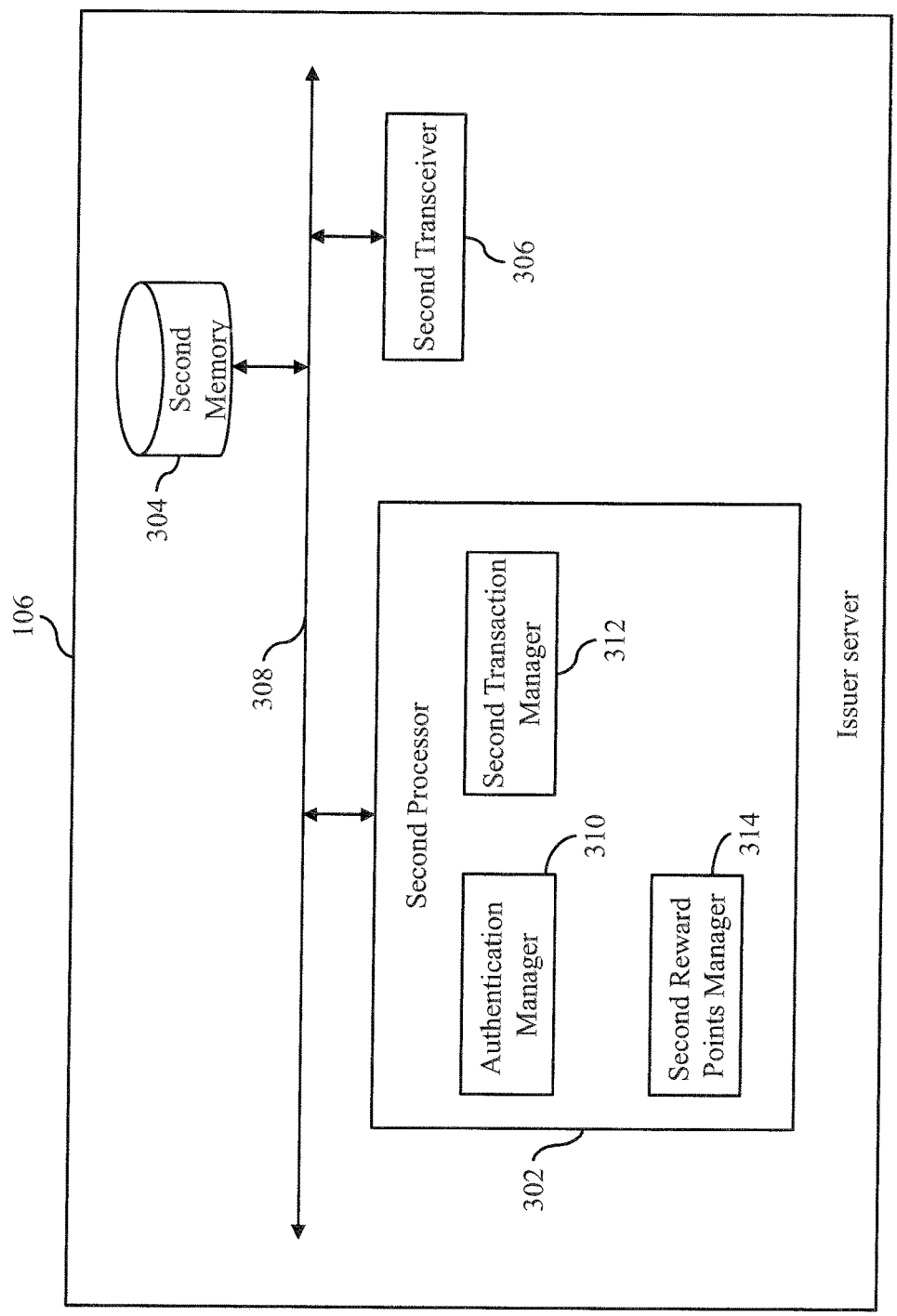
FIG. 3 is a block diagram that illustrates an issuer server of the communication environment of FIG. 1, in accordance with an embodiment of the present invention.

Referring now to FIG. 3, a block diagram that illustrates the issuer server 106 of the communication environment 100 of FIG. 1, in accordance with an embodiment of the present invention, is shown. The issuer server 106 includes a second processor 302, a second memory 304, and a second transceiver 306 that communicate with each other via a second bus 308. The second processor 302 includes an authentication manager 310, a second transaction manager 312, and a second reward points manager 314.

The second processor 302 includes suitable logic, circuitry, and/or interfaces to execute operations related to crediting or debiting of the user accounts and handling various requests that are received from one or more entities, such as the user device 104, the payment network server 108, the acquirer server 110, and the merchant server 112. Examples of the second processor 302 include, but are not limited to, an application-specific integrated circuit (ASIC) processor, a reduced instruction set computing (RISC) processor, a complex instruction set computing (CISC) processor, a field-programmable gate array (FPGA), and the like.

The second memory 304 includes suitable logic, circuitry, and/or interfaces to store user profiles of multiple users. For example, a user profile of the user 102 may include a registered contact information of the user 102, login details of the user 102 to access the user account that is maintained by the issuer bank, details of transaction cards associated with the user 102, and the account identification information. The second memory 304 further includes a set of computer readable instructions for hosting a mobile application or a website on the user device 104. Examples of the second memory 304 include a random-access memory (RAM), a read-only memory (ROM), a removable storage drive, a hard disk drive (HDD), and the like. It will be apparent to a person skilled in the art that the scope of the invention is not limited to realizing the second memory 304 in the issuer server 106, as described herein. In another embodiment, the second memory 304 may be realized in the form of a database server or a cloud storage working in conjunction with the issuer server 106, without departing from the scope of the invention.

The second transceiver 306 transmits and receives data over the communication network 114 via one or more communication network protocols. The second transceiver 306 transmits/receives various requests and messages to/from at least one of the user device 104, the payment network server 108, the acquirer server 110, or other entities that are pursuant to one or more standards for the interchange of transaction messages, such as the ISO8583 standard. Examples of the second transceiver 306 include, but are not limited to, an antenna, a radio frequency transceiver, a wireless transceiver, a Bluetooth transceiver, an ethernet port, a universal serial bus (USB) port, or any other device configured to transmit and receive data.

The authentication manager 310 includes suitable logic and/or interfaces for verifying the user 102, when the user 102 accesses the mobile application or the webpage hosted by the issuer server 106 on the user device 104. For example, when the user 102 logs-in to the mobile application or the website by entering the corresponding login details, the authentication manager 310 compares the login details entered by the user 102 with the login details included in the user profile of the user 102 stored in the second memory 304. In a scenario, if the authentication manager 310 determines that the login details entered by the user 102 match the login details included in the user profile of the user 102, the user 102 is granted access to the mobile application or the website. In an alternate scenario, if the authentication manager 310 determines that the login details entered by the user 102 do not match the login details included in the user profile of the user 102, the user 102 is denied access to the mobile application or the webpage.

The authentication manager 310 further verifies account identification information provided by the user 102 to authenticate a transaction, when the user 102 performs the transaction to purchase a product. The authentication manager 310 receives the transaction details by way of the credit or debit request from the payment network server 108 or the acquirer server 110 when the user 102 performs the transaction. The transaction details include the account identification information of the user 102, the transaction card details, and a transaction amount. The authentication manager 310 compares the account identification information provided by the user 102 with the account identification information included in the user profile of the user 102 that is stored in second memory 304, for verification. The authentication manager 310 further determines if the account of the user 102 has sufficient balance to cover the amount of the transaction. Based on the verification of the user 102 and the determination of the balance, the authentication manager 310 approves the transaction. The authentication manager 310 further authenticates the transactions by implementing various authentication techniques known in the art. The techniques may include transmitting a one-time password or initiating an interactive voice response (IVR) call on the user device 104 of the user 102.

The second transaction manager 312 includes suitable logic and/or interfaces for crediting or debiting the account of the user 102 based on the authentication performed by the authentication manager 310. Based on the amount included in the credit or debit request, the second transaction manager 312 performs the crediting or debiting of the amount in the user's account.

The second reward points manager 314 includes suitable logic and/or interfaces for determining reward points associated with each transaction. The second reward points manager 314 may associate monetary (such as cashback) or non-monetary benefits with the reward points and allots the benefits to the users, such as the user 102 when the user 102 redeems the reward points. The second reward points manager 314 further maintains a reward points database for each user in the second memory 304 and updates the database as and when the users, such as the user 102, perform transactions to earn the reward points. The second reward points manager 314 blocks the reward points from the account of the user 102 based on the block request received from the payment network server 108. The second reward points manager 314 may further initiate the block request. The functions performed by the authentication manager 310, the second transaction manager 312, and the second reward points manager 314 are explained in conjunction with FIGS. 4 and 5.

Figure 4A:
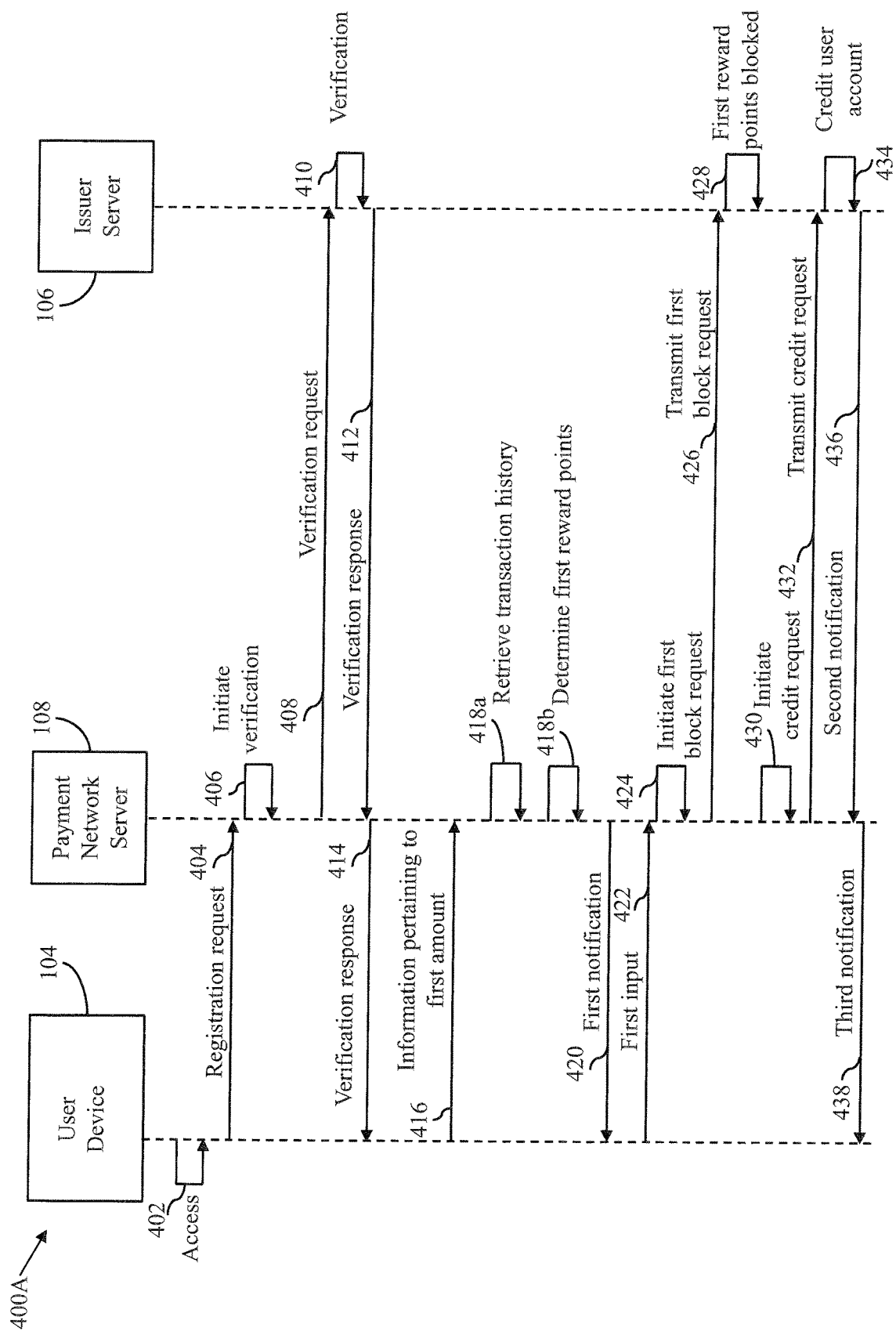
FIGS. 4A and 4B are process flow diagrams that illustrate crediting the account of the user and settling rewards points from the account of the user, respectively, in accordance with an embodiment of the present invention.
Figure 4B:
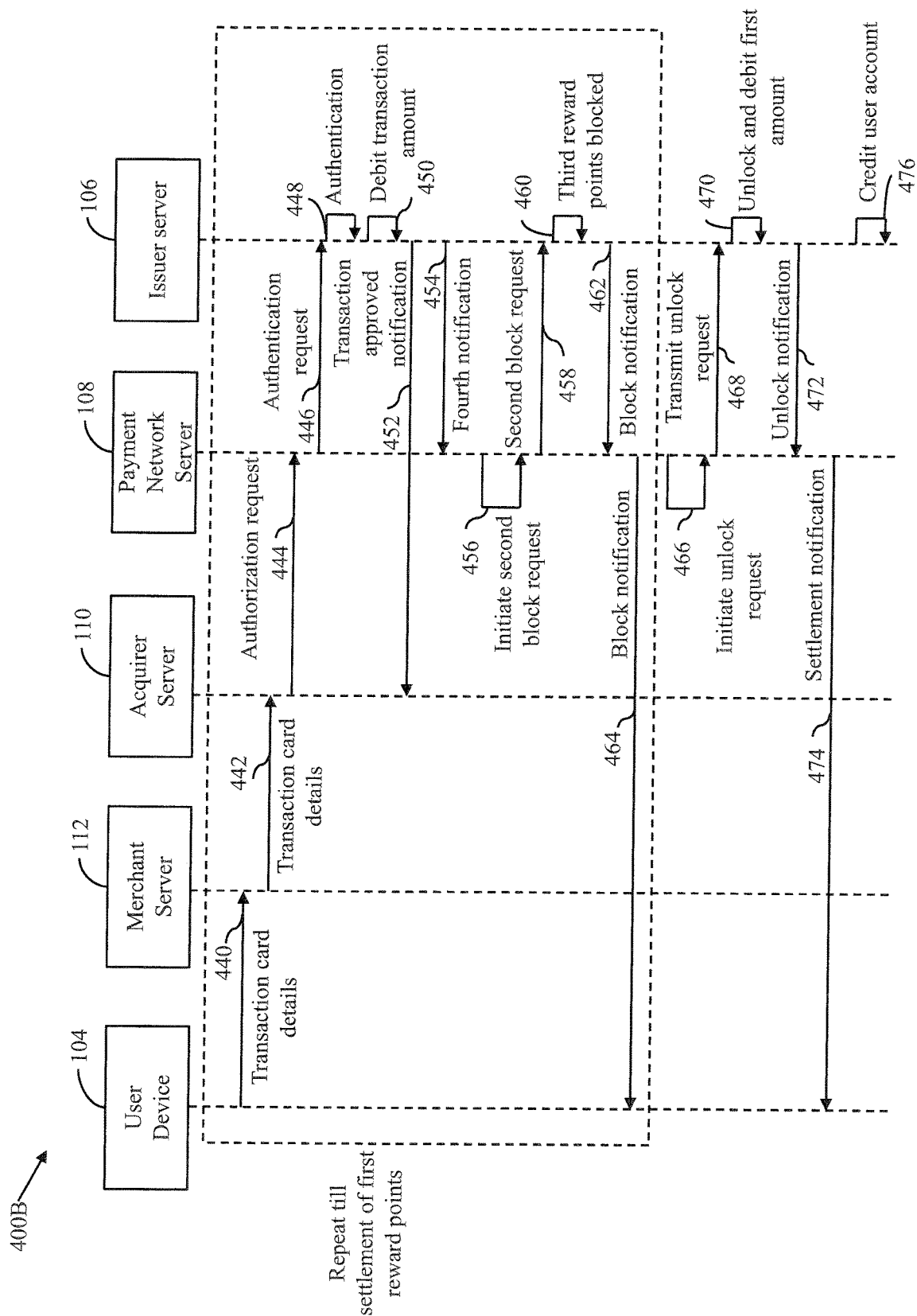

Referring now to FIGS. 4A and 4B, process flow diagrams 400A and 400B for crediting the account of the user 102 and settling the first reward points from the account of the user 102, respectively, in accordance with an embodiment of the present invention, are shown. With reference to FIG. 4A, the process flow diagram 400A for crediting the account of the user 102, illustrates the user device 104, the issuer server 106, and the payment network server 108. The user 102 accesses the mobile application or the website of the payment network server 108 to register a transaction card for a service that facilitates the maintenance of the minimum amount in the user account linked to the transaction card (as shown by arrow 402). The user 102 provides registration details such as a transaction card number of the transaction card, a user name, a phone number, an e-mail address, and/or a residential address for registering the transaction card through the mobile application or the website by way of a registration request raised by the user 102 (as shown by arrow 404). The first transceiver 206 receives the registration request from the user device 104. Based on the registration details in the registration request, the authorization manager 210 initiates a verification of the transaction card of the user 102 (as shown by arrow 406). During verification, the authorization manager 210 determines whether the transaction card is valid or invalid. The authorization manager 210 determines that the transaction card is valid, when the transaction card number provided by the user 102 matches the number of the transaction card included in the user profile of the user 102. The authorization manager 210 further ensures that the other registration details also match with the details of the user 102 included in the user profile that is stored in the first memory 204. In a scenario, when the transaction card number provided by the user 102 does not match the number of the transaction card included in the user profile of the user 102, the authorization manager 210 determines the transaction card to be invalid due to which the transaction card is not registered with the payment network server 108. The authorization manager 210 notifies the user 102 to provide the registration details again when the transaction card is invalid. The authorization manager 210 further determines if the transaction card has an associated cashback facility. The authorization manager 210 registers the transaction card for the service if the transaction card is valid and has an associated cashback facility.

In a scenario when the transaction card is valid, the authorization manager 210, in conjunction with the first transceiver 206, transmits a verification request to the issuer server 106 (as shown by arrow 408) to determine whether the user account associated with the transaction card is valid or invalid. The verification request includes the account identification information of the user account that is linked to the transaction card. On receiving the verification request, the authentication manager 310 verifies the user account based on the account identification information (as shown by arrow 410). In a scenario, when the account identification information corresponds to a user account that is maintained at the issuer bank, the authentication manager 310 determines that the user account is valid. In another scenario, when the account identification information corresponds to a user account that is not maintained at the issuer bank, the authentication manager 310 determines that the user account is invalid. The authentication manager 310 generates a verification response based on a result of the verification to indicate whether the user account is valid or invalid. The second transceiver 306 communicates the verification response to the payment network server 108 (as shown by arrow 412). The first transceiver 206 receives and communicates the verification response to the user 102 (as shown by arrow 414).

The user device 104 receives the verification response. Examples of the verification response may include a short message service (SMS) on the phone number of the user 102, an e-mail on the e-mail ID of the user 102, an IVR call on the phone number of the user 102, a push notification presented through the mobile application or the webpage, or the like. In a scenario, when the verification response indicates that the user account is invalid, the user 102 may provide the registration details again. In another scenario, when the verification response indicates that the user account is valid, the user 102 provides information pertaining to a first amount (as shown by arrow 416) through the mobile application or the webpage. The first amount is an amount which the user 102 wants to maintain in the user account. In an embodiment, the first amount is a minimum amount which is pre-decided by the issuer bank. In another embodiment, the first amount is a partial amount of the minimum amount. In yet another embodiment, when the user account is valid, the issuer server 106 may indicate the first amount associated with the user account through the verification response. In such scenario, the user 102 provides an approval or denial to the first amount as the information.

The first transceiver 206 receives the information pertaining to the first amount from the user device 104. The first reward points manager 214 further retrieves the transaction history of the transaction card of the user 102 (as shown by arrow 418a) from the first memory 204. The transaction history includes details of the transactions made by the user 102 in a set period of time, such as 3 months or 6 months. The details of the transaction may include date and time of conducting each of the transactions, merchant details, transaction amount associated with each of the transactions, or the like. Based on the information and the transaction history, the first reward points manager 214 determines first reward points (as shown by arrow 418b) that are equivalent to the first amount. In one example, the user 102 inputs USD 1,000 as the first amount and the first reward points manager 214 determines the first reward points as 500. The first reward points manager 214 further utilizes the transaction history to determine whether the user 102 is likely to conduct as many transactions required for settling the first reward points. In a scenario where the first reward points manager 214 determines that the user 102 is not likely to conduct transactions required for settling the first reward points, the first reward points manager 214 does not generate the first reward points In another scenario, where the first reward points manager 214 determines that the user 102 is likely to conduct the transactions required for settling the first reward points, the first reward points manager 214 in conjunction with the first transceiver 206, communicates information pertaining to the first reward points, i.e., blocking of the first reward points, and the locking of the first amount in the user account, to the user 102 by way of a first notification (as shown by arrow 420). The user device 104 receives the first notification. Examples of the first notification may include an SMS on the phone number of the user 102, an e-mail on the e-mail ID of the user 102, an IVR call on the phone number of the user 102, a push notification presented through the mobile application or the webpage, or the like. The user 102 may accept or decline the blocking of the first reward points and the locking of the first amount in the user account by way of a first input (as shown by arrow 422) to the payment network server 108.

In yet another scenario the first reward points manager 214 determines that the user 102 is likely to conduct transactions for partially settling the first reward points. In such scenario the first reward points manager 214 determines a second amount that is equivalent to the partial first reward points that are likely to be settled by the user 102. For example, though the user 102 may have provided USD 1,000 as the first amount which is equivalent to 500 reward points, the first reward points manager 214 determines that the user 102 is likely to settle only 250 reward points. The first reward points manager 214 then determines the second amount that is equivalent for settling the 250 reward points. In an example, the second amount is USD 500. In such scenario the first reward points manager 214 communicates information pertaining to the blocking of the partial first reward points and the locking of the second amount in the user account to the user 102 by way of the first notification. The user 102 may accept or decline the blocking of the partial first reward points and the locking of the second amount in the user account by way of the first input.

The first transceiver 206 receives the first input. When the first input indicates the acceptance of the user 102 with the blocking of the first reward points and the locking of the first amount, the first reward points manager 214 initiates a first block request to block the first reward points associated with the user account (as shown by arrow 424). In another scenario, the first reward points manager 214 initiates the first block request to block the partial first reward points associated with the user account. The first reward points manager 214, in conjunction with the first transceiver 206, transmits the first block request to the issuer server 106 (as shown by arrow 426). The second transceiver 306 receives the first block request. Based on the first block request, the second reward points manager 314 blocks the first reward points or the partial first reward points associated with the user account (as shown by arrow 428). The first transaction manager 212 initiates a credit request for crediting the first amount or the second amount in a lock mode in the user account (as shown by arrow 430) for a first time period. The first time period is a period of time allotted to the user 102 for performing as many transactions required for settling the first reward points. The first transceiver 206 transmits the credit request to the issuer server 106 (as shown by arrow 432). The first reward points manager 214 further determines a first time interval for the user 102 to settle predetermined reward points, referred to as predetermined points, of the first reward points in order to maintain the first amount or the second amount in the user account. For example, the first time period to settle the first reward points, i.e., 500 points, is 15 months. Thus, the first reward points manager 214 may determine that the first time interval to settle the predetermined points, for example 100 points, is 3 months. Therefore, the user 102 is required to perform as many transactions required for settling 100 points every 3 months. In an example, a transaction to purchase a garment from an 'X' brand would fetch 50 reward points to the user 102. Thus, to settle 100 reward points, the user 102 needs to purchase two such garments from 'X' brand to earn 100 reward points in the time interval of 3 months. In an event that the user 102 is not able to settle the predetermined points within the first time interval, the first reward points manager 214, in conjunction with the first transaction manager 212, initiates a debit request to debit the first amount or the second amount from the user account. In another scenario, the first time interval may be equal to the first time period. In yet another scenario, the first reward points manager 214 determines a second time interval which may be different than the first time interval. In an example, for the first time period of 15 months, the first time interval is 3 months and the second time interval is 6 months. Thus, the user 102 has to settle 100 reward points within the first time interval and predetermined reward points of the 400 reward points within the second time interval. In yet another scenario, the first reward points manager 214 does not determine the first time interval. In such scenario, the first reward points manager 214 monitors the user account to determine if the user 102 performs any transactions in the first time period to settle the first reward points. The first reward points manager 214 may initiate the debit request when the first reward points manager 214 determines that the user 102 is less likely to conduct any transactions. It will be understood by those skilled in the art that the predetermined points, the first time period, and the first time interval may vary and are not limited to the examples mentioned above.

The second transceiver 306 receives the credit request. Based on the credit request, the second transaction manager 312 credits the user account with the first amount or second amount which is in the lock mode, i.e., not available for the user 102 to use, for the first time period (as shown by arrow 434). The second transaction manager 312 further generates a second notification that indicates the blocking of the first reward points or the partial first reward points and the credit of the first amount or the second amount in the lock mode for the first time period in the user account. The second transceiver 306 transmits the second notification to the payment network server 108 (as shown by arrow 436).

The first transceiver 206 receives the second notification. Based on the second notification, the first reward points manager 214 generates a third notification that indicates the blocking of the first reward points or the partial first reward points, the first time interval to settle the predetermined points, and the crediting of the first amount or the second amount in the lock mode for the first time period in the user account. The first transceiver 206 transmits the third notification to the user device 104 (as shown by arrow 438). The user device 104 receives the third notification. Examples of the third notification include an SMS on the phone number of the user 102, an e-mail on the e-mail ID of the user 102, an IVR call on the phone number of the user 102, a push notification presented through the mobile application or the webpage, or the like. Based on the third notification, the user 102 is informed that the transaction card is registered for the service that facilitates the maintenance of the minimum amount (such as the first amount) in the user account.

With reference to FIG. 4B, the process flow diagram 400B for settling the first reward points from the user account, illustrates the user device 104, the merchant server 112, the acquirer server 110, the payment network server 108, and the issuer server 106. The user 102 performs a transaction by using the transaction card. In one embodiment, the user 102 performs the transaction at a point-of-sale (POS) device installed at a merchant store associated with the merchant server 112. In another embodiment, the user 102 uses the user device 104 to access a mobile application or a website hosted by the merchant server 112 for performing the transaction. Thus, the merchant server 112 receives the transaction card details of the transaction card when the user 102 performs the transaction (as shown by arrow 440). For the sake of ongoing discussion without limiting the spirit and scope of the present invention, it is being assumed here that the first reward points are blocked in the user account and the first amount is maintained in the user account.

On receiving the transaction card details, the merchant server 112 transmits the transaction card details to the acquirer server 110 (as shown by arrow 442). The acquirer server 110 receives the transaction card details and generates an authorization request for the authorization of the transaction. The authorization request includes the transaction card details such as date and time of the transaction, amount of the transaction, details of the transaction card used for the transaction, or the like. The acquirer server 110 transmits the authorization request to the payment network server 108 (as shown by arrow 444). The first transceiver 206 receives the authorization request via the communication network 114. The authorization manager 210 authorizes the transaction based on the transaction card details in the authorization request. For authorizing the transaction, the authorization manager 210 determines whether the transaction card is valid or invalid as described in FIG. 4A.

The authorization manager 210, in conjunction with the first transceiver 206, transmits an authentication request to the issuer server 106 for authenticating the user account that is linked to the transaction card (as shown by arrow 446). The second transceiver 306 receives the authentication request. Based on the authentication request, the authentication manager 310 performs an authentication to determine if the user account has sufficient funds to cover the transaction amount (as shown by arrow 448). In a scenario where the authentication manager 310 determines that the user account does not have sufficient funds to cover the transaction amount, the authentication manager 310 declines the transaction. In an alternate scenario where the authentication manager 310 determines that the user account has sufficient funds to cover the transaction amount, the authentication manager 310 approves the transaction and performs an authentication of the user 102. The authentication manager 310 may use various authentication techniques known in the art (such as one-time-passwords, biometric scan, voice authentication, or the like) for the authentication of the user 102. In a scenario, when the authentication of the user 102 fails, the authentication manager 310 declines the transaction. In an alternate scenario, when the authentication of the user 102 is successful, the authentication manager 310 approves the transaction. Based on the approval of the transaction by the authentication manager 310, the second transaction manager 312 debits the transaction amount from the user account (as shown by arrow 450). The second transaction manager 312, in conjunction with the second transceiver 306, transmits a transaction approved notification to the acquirer server 110 to credit the merchant account with the transaction amount (as shown by arrow 452). On receiving the transaction approved notification, the acquirer server 110 credits the merchant account with the transaction amount. The second transaction manager 312 further generates a fourth notification to indicate a deduction of the transaction amount from the user account. The second transceiver 306 transmits the fourth notification to the payment network server 108 (as shown by arrow 454).

The first transceiver 206 receives the fourth notification. Based on the fourth notification, the first reward points manager 214 determines whether the transaction has been performed within the first time interval. The first reward points manager 214 determines second reward points that are equivalent to the transaction amount of the transaction, when the transaction has been performed within the first time interval. The first reward points manager 214 further initiates a second block request to block third reward points that correspond to a difference of the first and second reward points and release the second reward points in the user account (as shown by arrow 456). The first transceiver 206 transmits the second block request to the issuer server 106 (as shown by arrow 458).

The second transceiver 306 receives the second block request. Based on the second block request, the second reward points manager 314 blocks the third reward points associated with the user account (as shown by arrow 460) and releases the second reward points. In one embodiment, the second reward points manager 314 may release a third amount from the user account based on the second block request. In another embodiment, the second reward points manager 314 may continue blocking the first amount in the user account until the user 102 settles all the first reward points within the first time period.

The second reward points manager 314, in conjunction with the second transceiver 306, notifies the blocking of the third reward points from the user account to the payment network server 108 by way of a block notification (as shown by arrow 462). In other words, the second reward points manager 314 notifies the payment network server 108 that the second reward points are released from the first reward points that are blocked, such that now only the difference of the first reward points and the second reward points (i.e., the third reward points) remains blocked in the user account. The first reward points manager 214 then notifies the user 102 by way of the block notification that the second reward points are settled and the user 102 is required to settle predetermined points from the third reward points within the first time interval (as shown by arrow 464).

In one embodiment, if the first reward points manager 214 determines that the transaction has not been performed within the first time interval, the first reward points manager 214 generates a release request for unlocking of the first amount in the user account and releasing the first amount to the payment network server 108. In other words, the first reward points manager 214 generates the release request for unlocking and debiting of the first amount from the user account, when the user 102 fails to settle the predetermined points within the first time interval. The first transceiver 206 transmits the release request to the issuer server 106.

It will be apparent to a person skilled in the art that the third reward points are settled against other transactions performed by the user 102 within the first time period until there are no reward points that are blocked in the user account.

To settle the first reward points, the user 102 performs the steps indicated by arrows (440-464). When the first reward points manager 214 determines that all the first reward points are settled within the first time period, the first reward points manager 214 in conjunction with the first transaction manager 212 initiates an unlock request (as shown by arrow 466). The first transaction manager 212 transmits the unlock request to the issuer server 106 using the first transceiver 206 (as shown by arrow 468). The second transceiver 306 receives the unlock request. The second transaction manager 312 unlocks and debits the first amount from the user account (as shown by arrow 470) and transmits an unlock notification to the payment network server 108 to indicate the unlocking and debiting of the first amount from the user account. The second transaction manager 312 further releases the first amount to the payment network server 108 (as shown by arrow 472). The payment network associated with the payment network server 108 receives the first amount. The payment network server 108 transmits a settlement notification to the user device 104 (as shown by arrow 474) which indicates that the first reward points are settled. In a scenario, the second transaction manager 312 credits the user account with the amount that is equivalent to the first reward points that are settled (as shown by arrow 476) after the first time period and releases the first amount that was maintained in the user account to the payment network server 108. In another scenario, the second transaction manager 312 unlocks the first amount from the user account for the user 102 to use and releases the first amount that is settled against the first reward points to the payment network server 108. In yet another scenario, the second transaction manager 312 keeps crediting the user account with an amount that is equivalent to the reward points earned by the user 102 as and when the user 102 performs transactions in the first time period. In such scenario the second transaction manager 312 debits the first amount from the user account after the first time period and releases the first amount to the payment network server 108. The payment network server 108 terminates the service for maintaining the minimum amount in the user account and informs the same to the user 102 in the settlement notification.

After receiving the settlement notification, the user 102 can create another account with a different transaction card or use the same login details provided by the payment network server 108 when the user 102 registered the account with the payment network, to maintain the minimum amount in the user account.

Figure 5A:
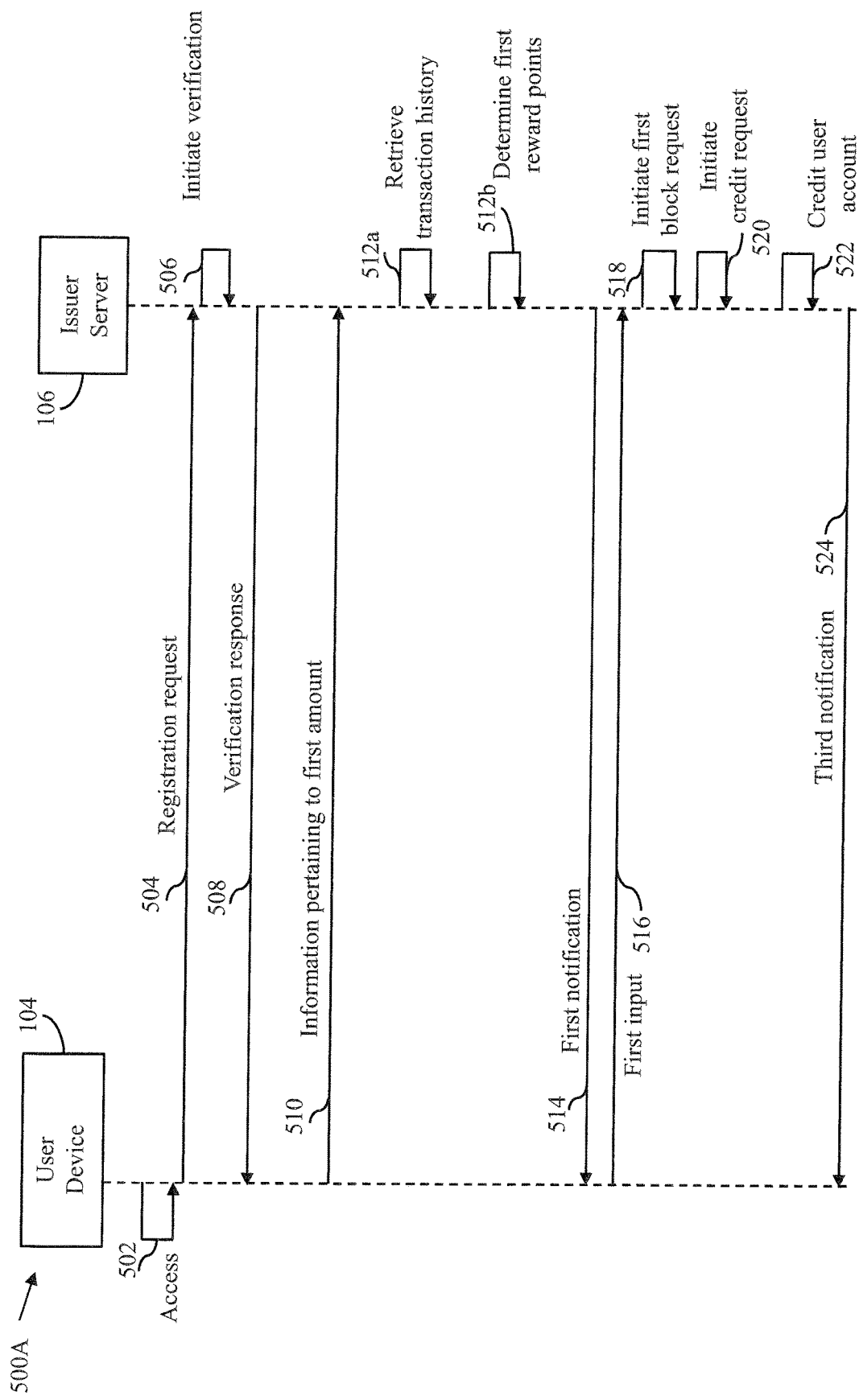
FIGS. 5A and 5B are process flow diagrams that illustrate crediting the account of the user and settling rewards points from the account of the user, respectively, in accordance with another embodiment of the present invention.
Figure 5B:
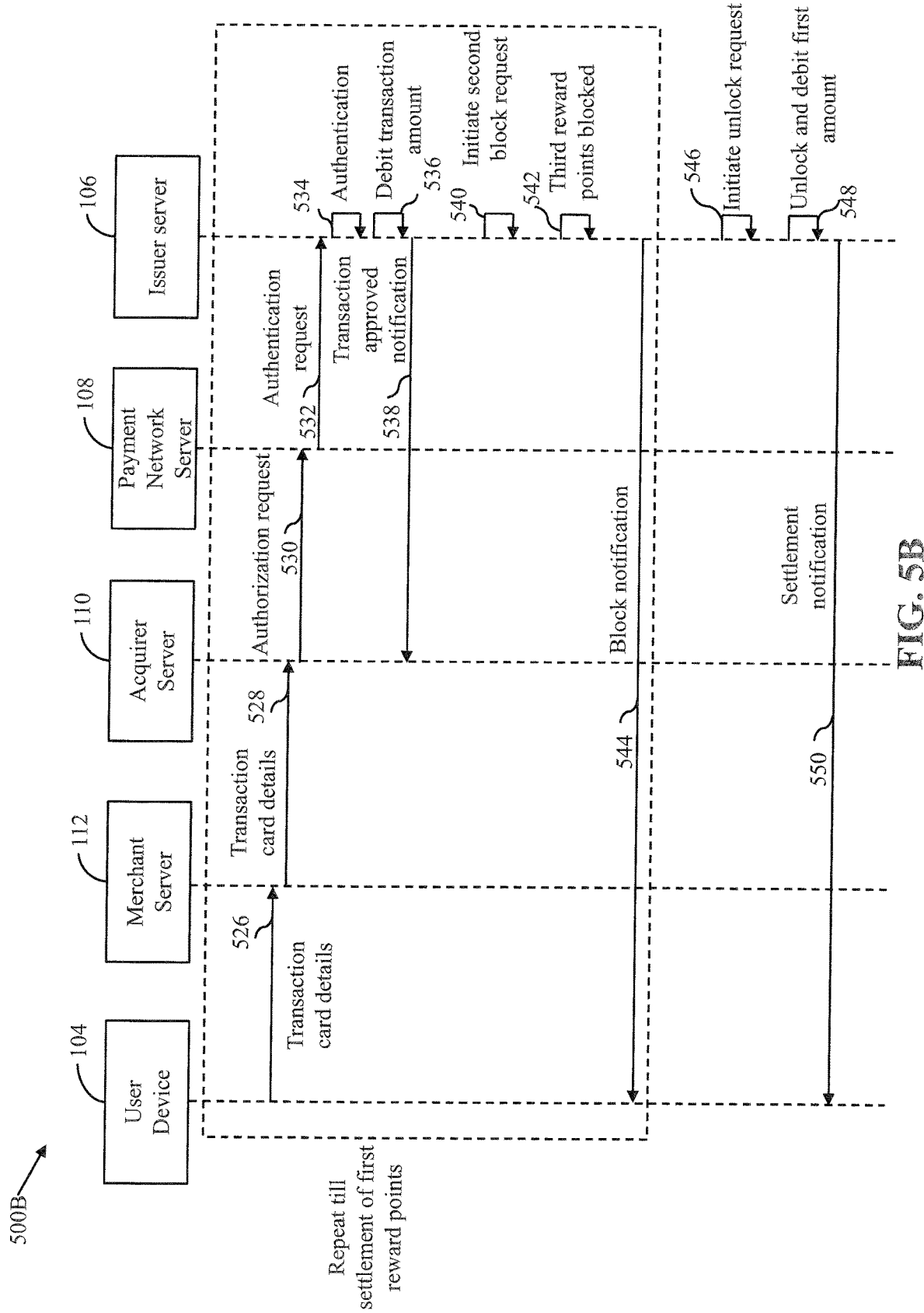

Referring now to FIGS. 5A and 5B, process flow diagrams 500A and 500B for crediting the account of the user 102 and settling the first reward points from the account of the user 102, respectively, in accordance with another embodiment of the present invention, are shown. With reference to FIG. 5A, the process flow diagram 500A illustrates the user device 104 and the issuer server 106 for crediting the user account with the first amount.

The user 102 accesses the mobile application or the website of the issuer server 106 to register the user account for a service that facilitates the maintenance of the minimum amount in the user account (as shown by arrow 502). The user 102 provides registration details by way of the registration request (as shown by arrow 504). The user 102 may have one transaction card associated with the user account or multiple transaction cards associated with the user account. In one embodiment, the issuer bank offers the facility of maintaining the minimum amount in the user account by way of a single transaction card. In another embodiment, the issuer bank offers the facility of maintaining the minimum amount in the user account by way of multiple transaction cards associated with the user account. When single transaction card is used to maintain the minimum amount in the user account, the registration details include a transaction card number of the transaction card, account identification details of the user account, a user name, a phone number, an e-mail address, and/or a residential address. When multiple transaction cards are used to maintain the minimum amount in the user account, the registration details include transaction card numbers of the transaction cards, account identification details of the user account, the user name, the phone number, the e-mail address, and/or the residential address of the user 102.

The second transceiver 306 receives the registration request from the user device 104 through the mobile application or the webpage of the issuer server 106. Based on the registration details, the authentication manager 310 initiates the verification of the user account of the user 102 and the transaction card/s associated with the user account (as shown by arrow 506). The verification of the user account and the transaction card/s is explained in FIG. 4A. In a scenario, when the authentication manager 310 determines that the user account is not valid, or the transaction card number of a first transaction card provided by the user 102 does not match the transaction card number included in the user profile of the user 102, or the first transaction card does not have an associated cashback facility, the authentication manager 310 determines that the user account is not eligible for availing the service. Similarly, the authentication manager 310 may not register the other transaction cards for availing the service, if it determines that the transaction cards are invalid or do not have an associated cashback facility. The authentication manager 310 further notifies the user 102 to provide the registration details again, when the transaction card/s is/are invalid.

The authentication manager 310 generates a verification response based on a result of the verification to indicate whether the user account is valid or invalid. The second transceiver 306 communicates the verification response to the user device 104 (as shown by arrow 508). In one embodiment, the verification response indicates that the user account is valid. The user 102 provides the information pertaining to the first amount (as shown by arrow 510) through the mobile application or the webpage of the issuer server 106. In a scenario, the first amount is a minimum amount which is pre-decided by the issuer bank. In another scenario, the first amount is a partial amount of the minimum amount. In another embodiment, the verification response includes the information pertaining to the first amount, and the user 102 may provide the information as an approval or denial to the first amount. In yet another embodiment, when the verification response indicates that the user account is invalid, the user 102 may provide the registration details again.

The second transceiver 306 receives the information pertaining to the first amount from the user device 104. The second reward points manager 314 retrieves the transaction history associated with the transaction card of the user 102 (as shown by arrow 512a) from the second memory 304. Based on the information pertaining to the first amount and the transaction history, the second reward points manager 314 determines the first reward points (as shown by arrow 512b) that are equivalent to the first amount.

The second reward points manager 314 further utilizes the transaction history to determine whether the user 102 is likely to conduct as many transactions required for settling the first reward points. In a scenario the second reward points manager 314 determines that the user 102 is likely to conduct as many transactions required for settling the first reward points. Thus, the second reward points manager 314, in conjunction with the second transceiver 306, communicates information pertaining to the blocking of the first reward points and the locking of the first amount in the user account to the user 102 by way of the first notification (as shown by arrow 514).

In another scenario where the second reward points manager 314 determines that the user 102 is likely to conduct as many transactions required for settling the first reward points partially, the second reward points manager 314 determines the second amount that is equivalent to the partial first reward points that are likely to be settled by the user 102. The second reward points manager 314, in conjunction with the second transceiver 306, communicates information pertaining to the blocking of the partial first reward points and the locking of the second amount to the user 102 by way of the first notification. In yet another scenario where the second reward points manager 314 determines that the user 102 is not likely to conduct as many transactions required for settling the first reward points either completely or partially, the second reward points manager 314 may communicate the first notification to the user 102 for providing another first amount or for indicating that the user account is not eligible for availing the service. For the sake of simplicity, the registration of the user account is explained with respect to the first amount and the first reward points without limiting the spirit and scope of the present invention.

The user 102 receives the first notification and may accept or decline the blocking of the first reward points and the locking of the first amount by way of the first input (as shown by arrow 516). The second transceiver 306 receives the first input. In one scenario, when the first input indicates the decline of the blocking of the first reward points, the second reward points manager 314 terminates the registration of the user account and notifies the user 102. In another scenario, when the first input indicates the acceptance of the user 102 with the blocking of the first reward points and the locking of the first amount in the user account, the second reward points manager 314 initiates the first block request to block the first reward points from the user account (as shown by arrow 518). Based on the first block request, the second reward points manager 314 blocks the first reward points from the user account. The second transaction manager 312 initiates the credit request for crediting the first amount in the lock mode in the user account (as shown by arrow 520) for the first time period. The second transaction manager 312 credits the user account with the first amount which is in the lock mode for the first time period (as shown by arrow 522). Since the first amount is in the lock mode, the first amount is not available for use to the user 102. The first reward points manager 214 further determines the first time interval for the user 102 to settle predetermined points from the first reward points to remain eligible for availing the service. In an event that the user 102 is not able to settle the predetermined points within the first time interval, the second reward points manager 314, in conjunction with the second transaction manager 312, initiates the debit request to debit the first amount from the user account.

The second transaction manager 312 further generates the third notification that indicates the blocking of the first reward points and the crediting of the first amount in the lock mode for the first time period in the user account. The third notification further indicates the first time interval to settle the predetermined points. The second transceiver 306 transmits the third notification to the user device 104 (as shown by arrow 524). Based on the third notification, the user 102 is informed that the user account is registered for the service that facilitates the maintenance of the minimum amount (such as the first amount) in the user account.

With reference to FIG. 5B, the process flow diagram 500B for settling the first reward points from the user account, illustrates the user device 104, the merchant server 112, the acquirer server 110, the payment network server 108, and the issuer server 106. The user 102 performs a transaction by using a first transaction card, hereinafter the transaction card. The merchant server 112 receives the transaction card details of the transaction card when the user 102 performs the transaction (as shown by arrow 526).

On receiving the transaction card details, the merchant server 112 transmits the transaction card details to the acquirer server 110 (as shown by arrow 528). The acquirer server 110 receives the transaction card details and generates the authorization request for the authorization of the transaction. The acquirer server 110 transmits the authorization request to the payment network server 108 (as shown by arrow 530). The first transceiver 206 receives the authorization request via the communication network 114. The authorization manager 210 identifies the transaction card details and the account number of the user account in the authorization request and transmits the authentication request to the issuer server 106.

The second transceiver 306 receives the authentication request (as shown by arrow 532). Based on the authentication request, the authentication manager 310 performs the authentication to determine if the user account has sufficient funds to cover the transaction amount (as shown by arrow 534). In a scenario where the authentication manager 310 determines that the user account does not have sufficient funds to cover the transaction amount, the authentication manager 310 declines the transaction. In an alternate scenario where the authentication manager 310 determines that the user account has sufficient funds to cover the transaction amount, the authentication manager 310 approves the transaction and performs the authentication of the user 102. In a scenario, when the authentication of the user 102 fails, the second transaction manager 312 declines the transaction. In an alternate scenario, when the authentication of the user 102 is successful, the second transaction manager 312 approves the transaction. Based on the approval of the transaction, the second transaction manager 312 debits the transaction amount from the user account (as shown by arrow 536). The second transaction manager 312, in conjunction with the second transceiver 306, transmits the transaction approved notification to the acquirer server 110 to credit the merchant account with the transaction amount (as shown by arrow 538). On receiving the transaction approved notification, the acquirer server 110 credits the merchant account with the transaction amount.

The second reward points manager 314 determines whether the transaction has been performed within the first time interval. The second reward points manager 314 determines the second reward points that are equivalent to the transaction amount of the transaction, when the transaction has been performed within the first time interval. The second reward points manager 314 further initiates the second block request (as shown by arrow 540). Based on the second block request, the second reward points manager 314 blocks the third reward points that correspond to a difference of the first and second reward points and settles the second reward points from the first reward points in the user account (as shown by arrow 542). In other words, the second reward points manager 314 releases the second reward points from the user account and continues to block the difference of the first and second reward points (i.e., the third reward points) based on the second block request. In one embodiment, the second reward points manager 314 may release the third amount equivalent to the second reward points from the user account based on the second block request. In another embodiment, the second reward points manager 314 may continue blocking the first amount in the user account until the user 102 settles all the first reward points within the first time period.

The second reward points manager 314, in conjunction with the second transceiver 306, notifies the user 102 by way of the block notification that the second reward points are settled and the user 102 is required to settle predetermined points from the third reward points within the first time interval (as shown by arrow 544).

When the second reward points manager 314 determines that all the first reward points are settled within the first time period, the second reward points manager 314 in conjunction with the second transaction manager 312, initiates the unlock request to unlock and debit the first amount from the user account (as shown by arrow 546). Thus, the second transaction manager 312 unlocks and debits the first amount from the user account (as shown by arrow 548). The issuer server 106 transmits the settlement notification and communicates it to the user 102 (as shown by arrow 550). The settlement notification indicates that the first reward points are settled. The issuer server 106 terminates the service for maintaining the minimum amount in the user account and informs the same to the user 102 in the settlement notification.

In one embodiment, when the second reward points manager 314 determines that the user 102 has not performed any transaction within the first time interval, the second reward points manager 314 may generate the release request for unlocking and debiting of the first amount from the user account. Based on the release request, the second transaction manager 312 debits the first amount from the user account and terminates the service for maintaining the minimum amount in the user account.

It will be apparent to a person skilled in the art that if the user 102 performs a transaction by way of a transaction card that belongs to a different payment network, the authorization request will be received by the corresponding payment network server. Further, the issuer server 106 determines the reward points associated with each such transaction and credits the first amount associated with the reward points in the user account.

Figure 6A:
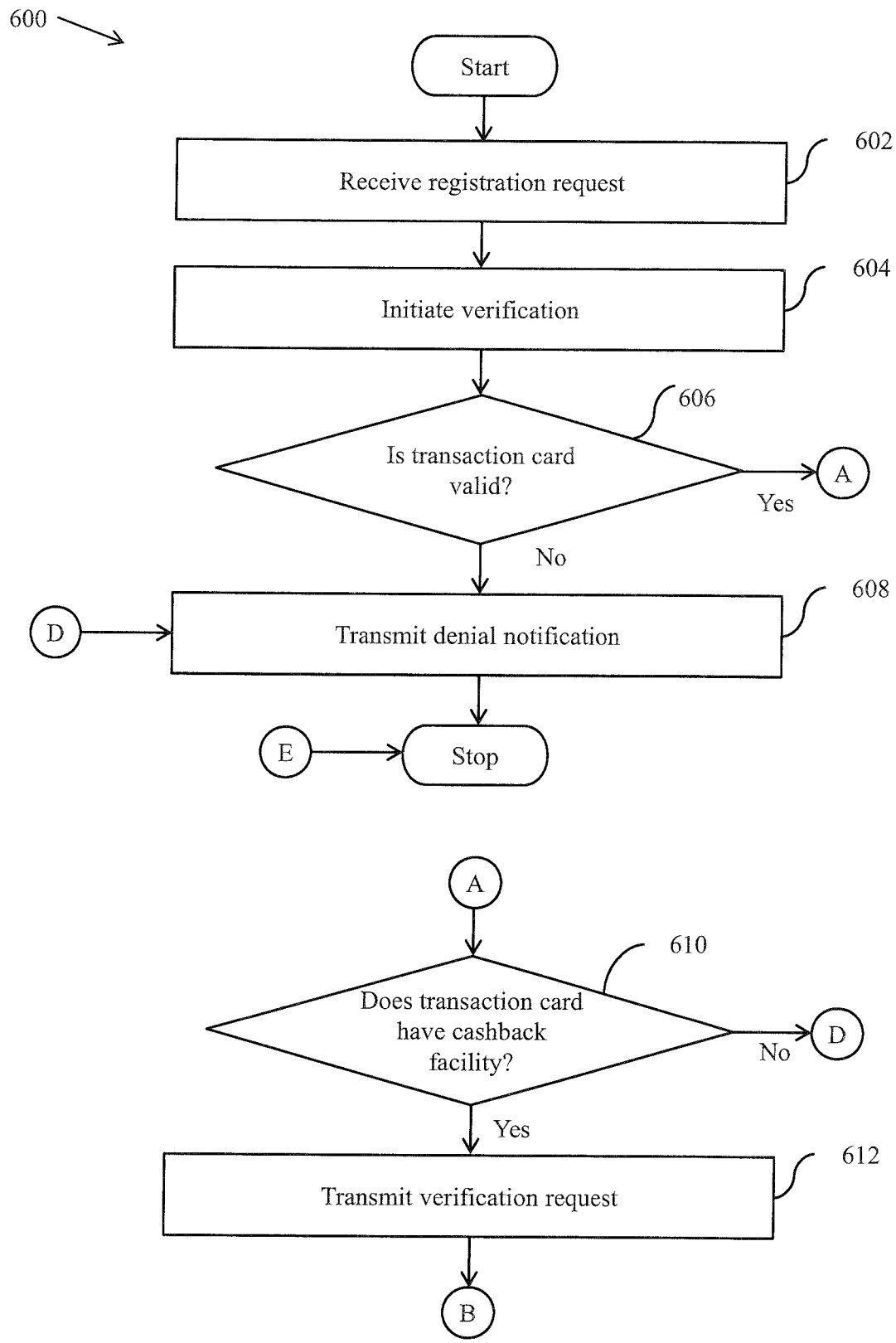
FIGS. 6A-6C collectively represent a flow chart that illustrates a method for crediting the account of the user, in accordance with an embodiment of the present invention.
Figure 6B:
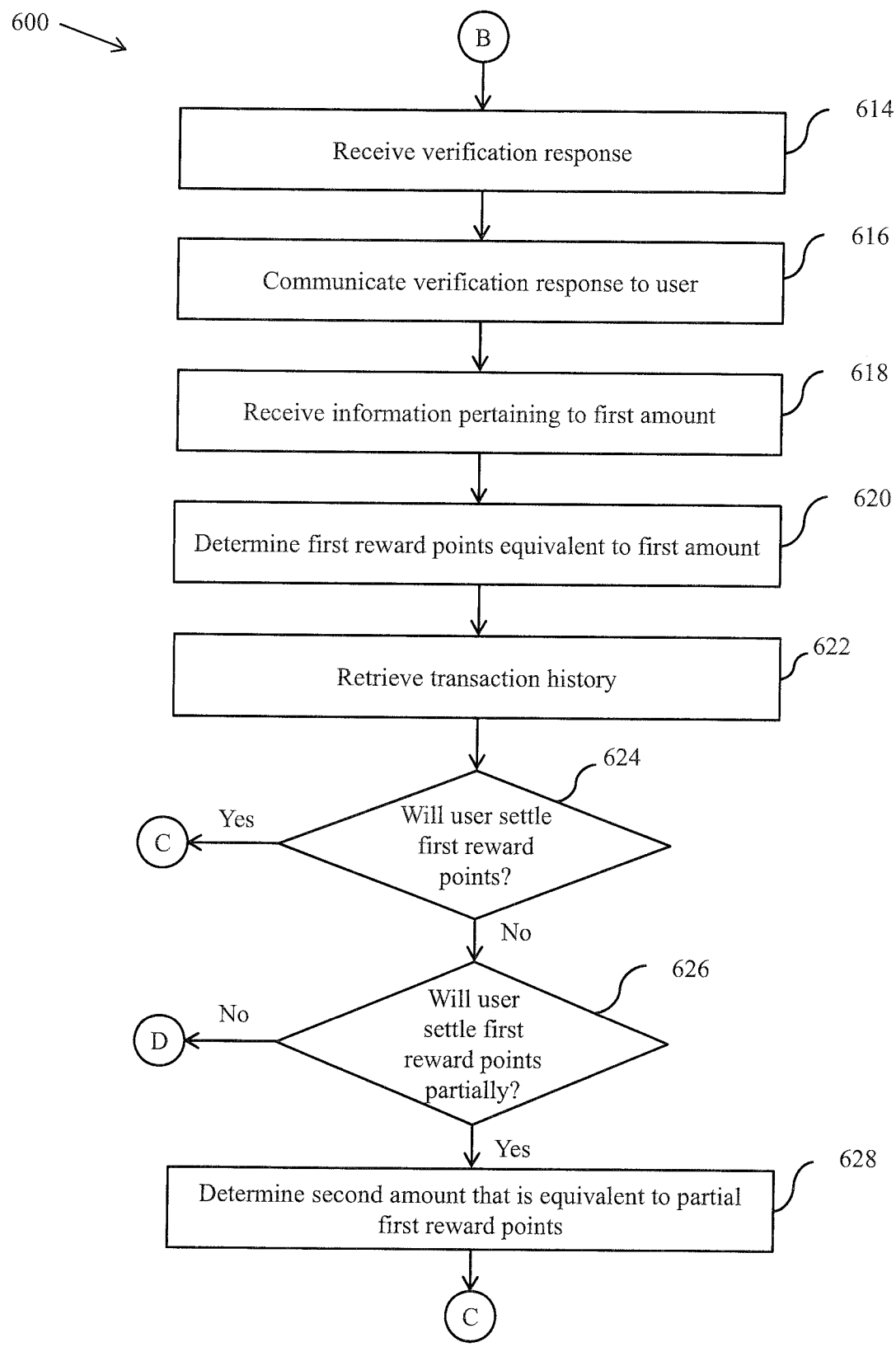
Figure 6C:
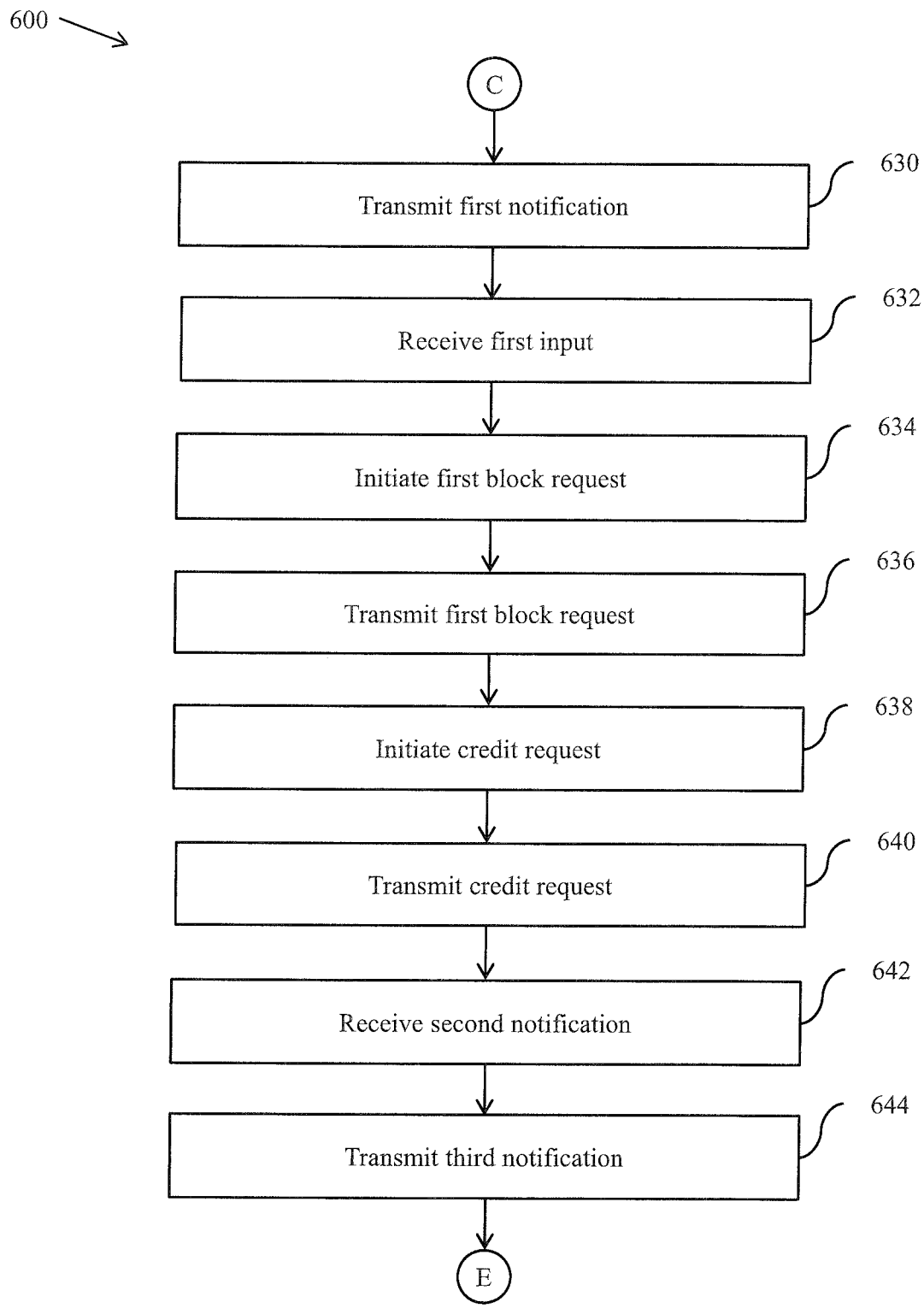

Referring now to FIGS. 6A-6C, a flow chart 600 that illustrates a method for crediting the user account, in accordance with an embodiment of the present invention, is shown. The flow chart 600 is read in conjunction with FIG. 4A. The user 102 accesses the mobile application or the webpage of the payment network server 108 to register the transaction card for a service that facilitates the maintenance of the minimum amount in the user account linked to the transaction card. For registering the transaction card, the user 102 provides the registration details through the mobile application or the webpage.

At step 602, the payment network server 108 receives the registration details by way of the registration request provided by the user 102. At step 604, the payment network server 108 initiates the verification of the transaction card based on the registration details. At step 606, the payment network server 108 determines whether the transaction card is valid or invalid by comparing the details of the transaction card included in the registration details with the transaction card details stored in the user profile of the user 102. If at step 606, the payment network server 108 determines that the transaction card is not valid, step 608 is performed. At step 608, the payment network server 108 transmits a denial of service notification to the user 102. However, if at step 606, the payment network server 108 determines that the transaction card is valid, step 610 is performed. At step 610, the payment network server 108 determines whether the transaction card has an associated cashback facility. If at step 610, the payment network server 108 determines that the transaction card does not have an associated cashback facility, step 608 is performed. However, if at step 610, the payment network server 108 determines that the transaction card has an associated cashback facility, step 612 is performed.

At step 612, the payment network server 108 transmits the verification request to the issuer server 106 to determine whether the user 102 holds a valid account associated with the transaction card. At step 614, the payment network server 108 receives the verification response from the issuer server 106. At step 616, the payment network server 108 communicates the verification response to the user 102. In one scenario, the verification response may indicate if the user account is valid or invalid. In another scenario, the verification response may include the information pertaining to the first amount.

At step 618, the payment network server 108 receives the information pertaining to the first amount from the user 102. In another embodiment, the payment network server 108 receives the approval or denial provided by the user 102 to the first amount. At step 620, the payment network server 108 determines the first reward points that are equivalent to the first amount. At step 622, the payment network server 108 retrieves the transaction history of the transaction card of the user 102 from the first memory 204. At step 624, the payment network server 108 determines whether the user 102 is likely to conduct as many transactions using the transaction card within the first time period for settling the first reward points. If at step 624, the payment network server 108 determines that the user 102 may not be able to conduct as many transactions to settle the first reward points, step 626 is performed. At step 626, the payment network server 108 determines whether the user 102 is likely to conduct as many transactions to settle the first reward points partially. If at step 626, the payment network server 108 determines that the user 102 may not conduct as many transactions to settle the first reward points partially, step 608 is performed. However, if at step 626, the payment network server 108 determines that the user 102 may conduct as many transactions to settle the first reward points partially, step 628 is performed. At step 628, the payment network server 108 determines the second amount that is equivalent to the partial first reward points that the user 102 is likely to settle and step 630 is performed. It will be apparent to a person skilled in the art that in this scenario the second amount is less than the first amount. If at step 624, the payment network server 108 determines that the user 102 is likely to conduct as many transactions to settle the first reward points, step 630 is performed.

At step 630, the payment network server 108 transmits the first notification to the user 102. In one embodiment, the first notification includes information pertaining to the first amount and the first reward points. In another embodiment, the first notification includes information pertaining to the second amount and the partial first reward points. In response to the first notification, the user 102 provides the first input through the mobile application or the webpage of the payment network server 108.

At step 632, the payment network server 108 receives the first input from the user 102. At step 634, the payment network server 108 initiates the first block request to block one of the first reward points and the partial first reward points for the first time period from the user account, when the user 102 accepts the blocking of one of the first reward points and partial first reward points, respectively.

At step 636, the payment network server 108 transmits the first block request to the issuer server 106. The issuer server 106 receives the first block request.

At step 638, the payment network server 108 initiates the credit request to credit one of the first and second amounts in the user account in the lock mode for the first time period. At step 640, the payment network server 108 transmits the credit request to the issuer server 106. Based on the credit request, the issuer server 106 credits one of the first and second amounts in the lock mode for the first time period in the user account.

At step 642, the payment network server 108 receives the second notification from the issuer server 106. The second notification indicates that one of the first reward points and the partial first reward points is blocked from the user account. The second notification further indicates that one of the first and second amounts is credited in the lock mode for the first time period in the user account. At step 644, the payment network server 108 transmits the third notification to the user device 104. In one scenario, the third notification indicates the blocking of the first reward points and the crediting of the first amount in the lock mode for the first time period in the user account. The third notification further indicates the first time interval within which the user 102 is required to settle the predetermined points from the first reward points. In another scenario, the third notification indicates the blocking of the partial first reward points and the crediting of the second amount in the lock mode for the first time period in the user account. The third notification further indicates the first time interval within which the user 102 is required to settle the predetermined points from the partial first reward points. It will be apparent to a person skilled in the art that the functions performed by the payment network server 108 in FIGS. 6A-6C are performed by at least one of the authorization manager 210, the first transaction manager 212, and the first reward points manager 214 as explained in FIG. 4A. It will further be apparent to a person skilled in the art that the functions performed by the issuer server 106 in FIGS. 6A-6C are performed by at least one of the authentication manager 310, the second transaction manager 312, and the second reward points manager 314 as explained in FIG. 4A.

Figure 7A:
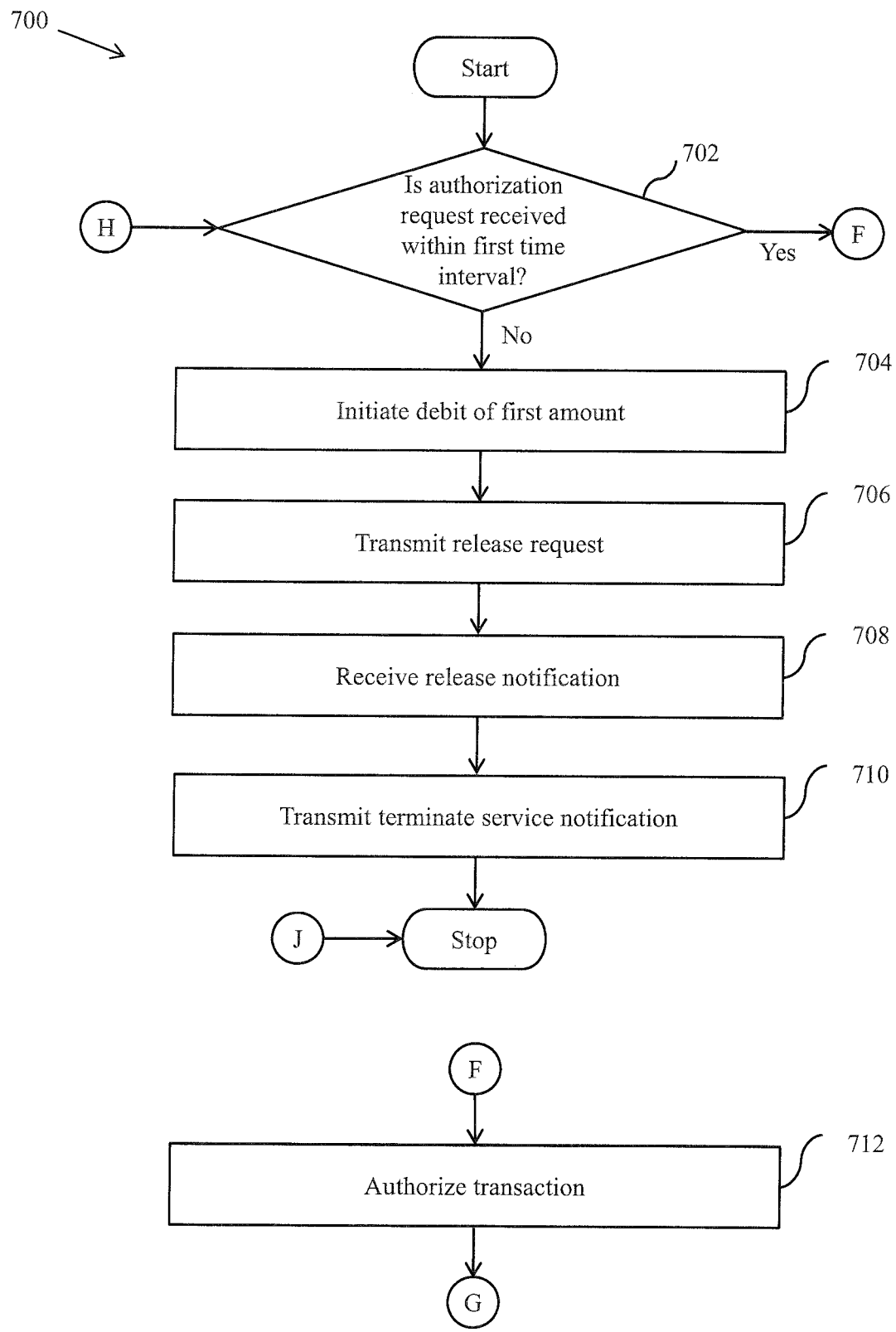
FIGS. 7A-7C collectively represent a flow chart that illustrates a method for settling the reward points from the account of the user, in accordance with an embodiment of the present invention.
Figure 7B:
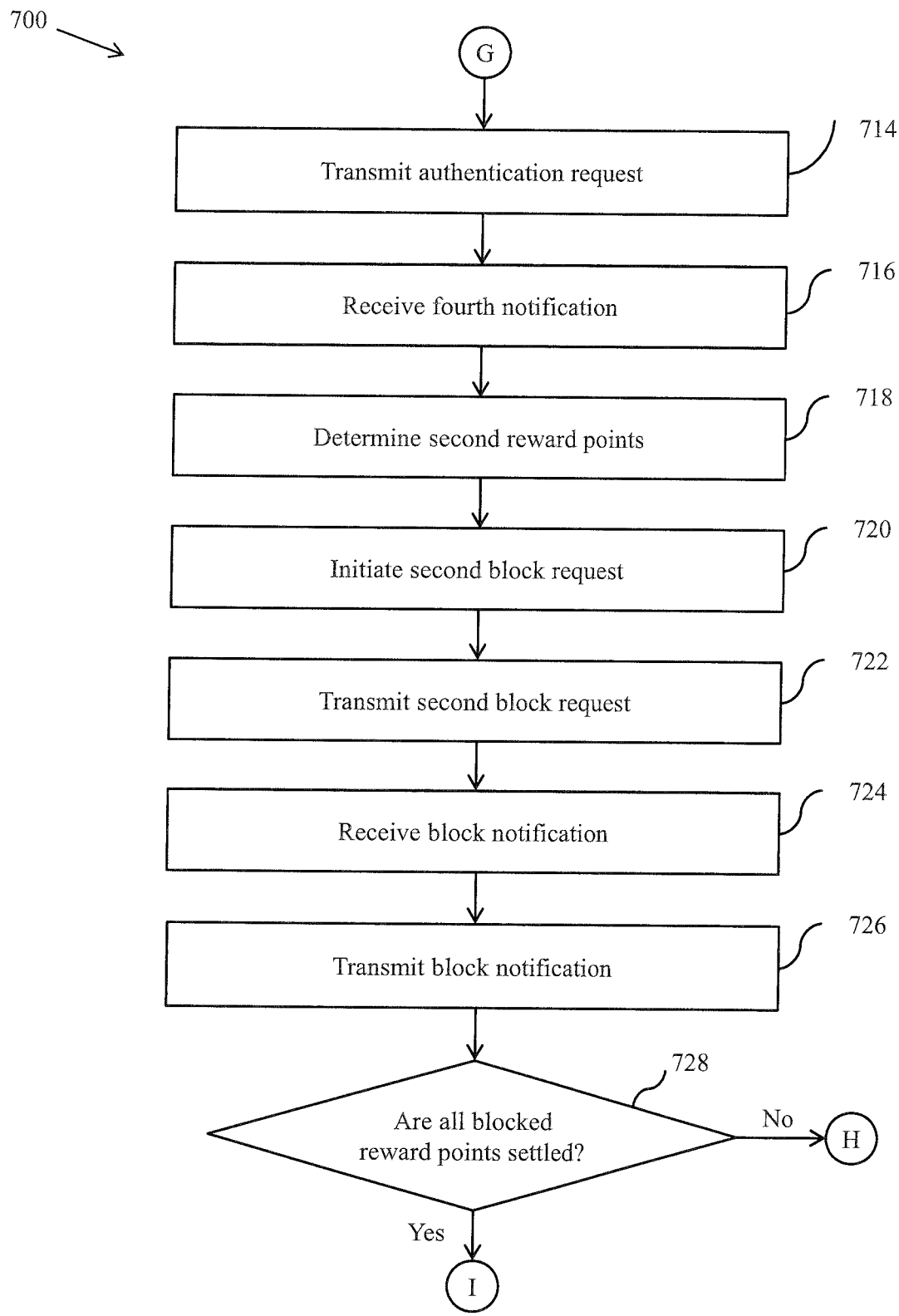
Figure 7C:
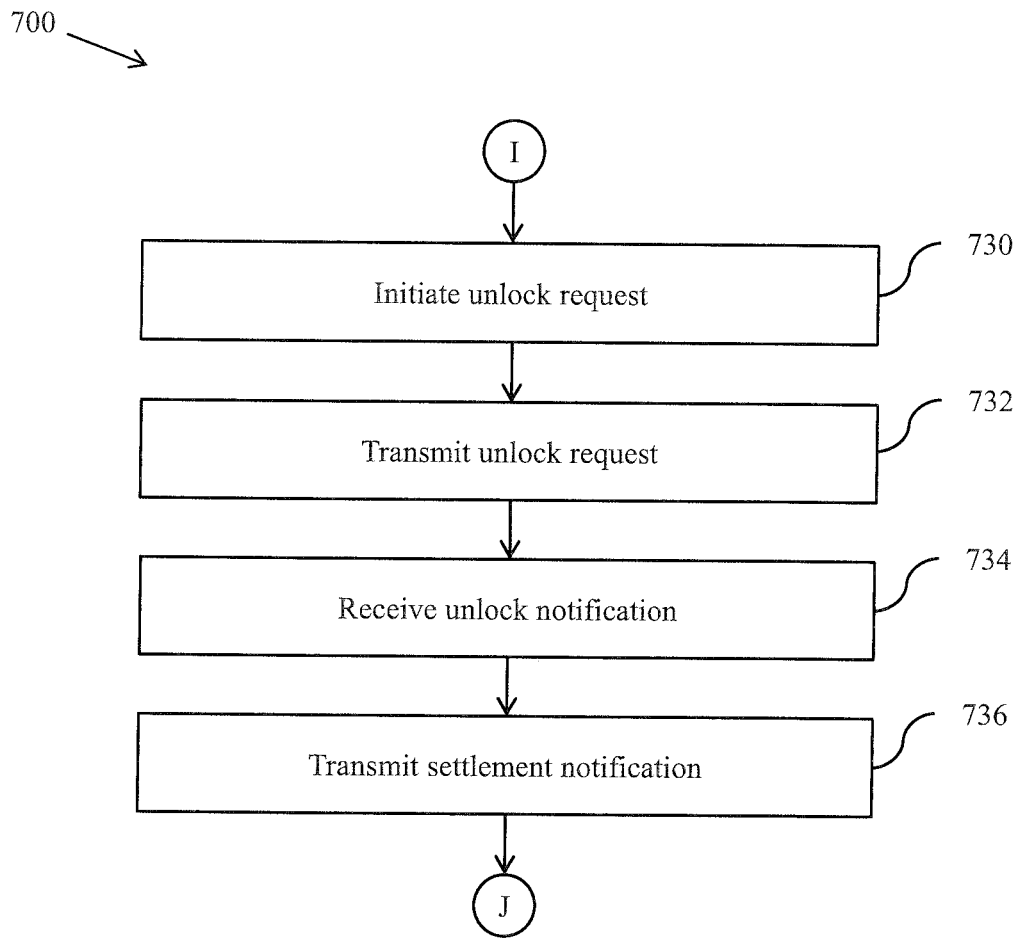

Referring now to FIGS. 7A-7C, a flow chart 700 that illustrates a method for settling the first reward points from the account of the user 102, in accordance with an embodiment of the present invention, is shown. The flow chart 700 is read in conjunction with FIG. 4B. The payment network server 108 monitors the user account that is linked to the transaction card, which is registered with the payment network server 108 for the service that facilitates the maintenance of the minimum amount in the user account.

At step 702, the payment network server 108 determines whether any authorization request for a transaction from the user account is received within the first time interval. If at step 702, the payment network server 108 determines that no authorization request that corresponds to a transaction from the user account is received within the first time interval, step 704 is performed. At step 704, the payment network server 108 initiates the debit of the first amount from the user account as the user 102 has failed to settle the predetermined points from the first reward points within the first time interval. The payment network server 108 initiates the debit of the first amount from the first account by generating the debit request. At step 706, the payment network server 108 transmits the release request to the issuer server 106. The issuer server 106 receives the release request and debits the first amount from the user account for releasing the first amount to the payment network server 108. At step 708, the payment network server 108 receives the release notification from the issuer server 106. The release notification indicates the debit and release of the first amount from the user account. At step 710, the payment network server 108 transmits a terminate service notification to the user 102. The terminate service notification indicates that the service for maintaining the first amount in the user account is terminated.

However, if at step 702, the payment network server 108 determines that an authorization request that corresponds to a transaction from the user account is received from the acquirer server 110 within the first time interval, step 712 is performed. The authorization request includes the transaction card details of the transaction card used by the user 102 for performing the transaction at a merchant. The merchant is associated with the merchant server 112 and has a bank account in the acquirer bank that is associated with the acquirer server 110. At step 712, the payment network server 108 authorizes the transaction based on the transaction card details included in the authorization request. For authorizing the transaction, the payment network server 108 determines whether the transaction card is valid or invalid as described in conjunction with FIG. 4A.

At step 714, the payment network server 108 transmits the authentication request to the issuer server 106 for authenticating the user 102 and the user account, when the transaction card is valid. The issuer server 106 performs the authentication of the user 102 and the user account, based on the authentication request. When the authentication of the user 102 is successful, the issuer server 106 debits a transaction amount associated with the transaction from the user account and generates the fourth notification. At step 716, the payment network server 108 receives the fourth notification from the issuer server 106. The fourth notification indicates that the transaction amount is deducted from the user account.

At step 718, the payment network server 108 determines the second reward points that are equivalent to the transaction amount of the transaction. At step 720, the payment network server 108 initiates the second block request. At step 722, the payment network server 108 transmits the second block request to the issuer server 106. Based on the second block request, the issuer server 106 settles the second reward points from the first reward points and the difference of the first and second reward points (i.e., the third reward points) remain blocked until the user 102 performs other transactions by using the transaction card. At step 724, the payment network server 108 receives the block notification from the issuer server 106. At step 726, the payment network server 108 transmits the block notification to the user 102. The block notification indicates that the second reward points from the first reward points are settled and the user 102 is further required to settle the predetermined reward points from the third reward points within the first time interval.

At step 728, the payment network server 108 determines whether all blocked reward points associated with the user account are settled. If at step 728, the payment network server 108 determines that all blocked reward points associated with the user account are not settled, the payment network server 108 waits for the user 102 to perform another transaction in the next time interval and step 702 is performed. If at step 728, the payment network server 108 determines that all the blocked reward points associated with the user account are settled, step 730 is performed.

At step 730, the payment network server 108 initiates the unlock request for unlocking and debiting of the first amount from the user account. At step 732, the payment network server 108 transmits the unlock request to the issuer server 106. Based on the unlock request, the issuer server 106 unlocks and debits the first amount from the user account. At step 734, the payment network server 108 receives the unlock notification from the issuer server 106. At step 736, the payment network server 108 transmits the settlement notification to the user device 104. The settlement notification indicates that the first reward points are settled and are now unblocked. The issuer server 106 credits the user account with the amount that is equivalent to the first reward points that are settled. It will be apparent to a person skilled in the art that the functions performed by the payment network server 108 in FIGS. 7A-7C are performed by at least one of the authorization manager 210, the first transaction manager 212, and the first reward points manager 214 as explained in FIG. 4B. It will further be apparent to a person skilled in the art that the functions performed by the issuer server 106 in FIGS. 7A-7C are performed by at least one of the authentication manager 310, the second transaction manager 312, and the second reward points manager 314 as explained in FIG. 4B. It will further be apparent to a person skilled in the art that the payment network server 108 may execute the above-mentioned steps of FIGS. 7A-7C for settling the partial first reward points that are blocked from the user account.

Figure 8A:
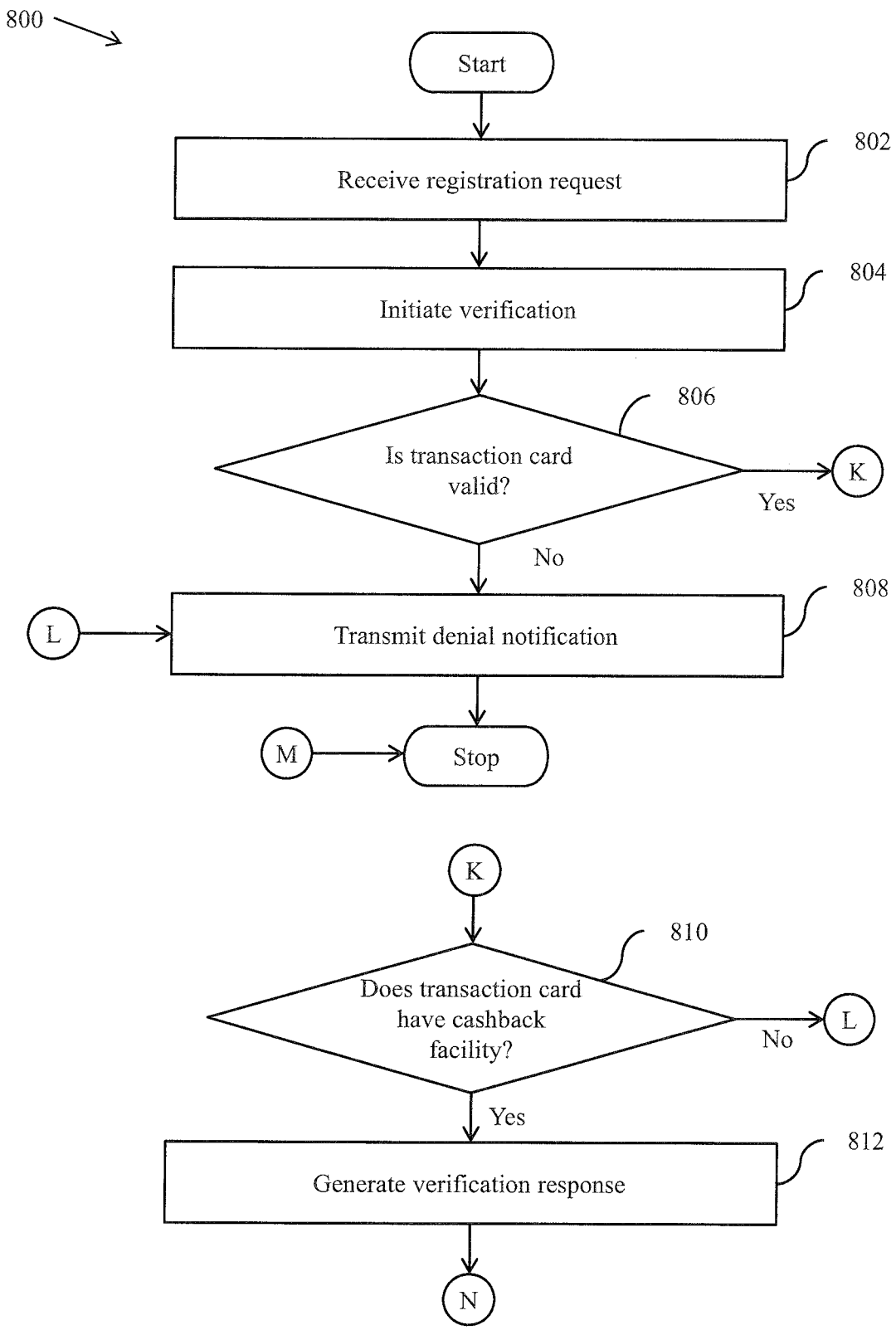
FIGS. 8A-8C collectively represent a flow chart that illustrates a method for crediting the account of the user, in accordance with another embodiment of the present invention.
Figure 8B:
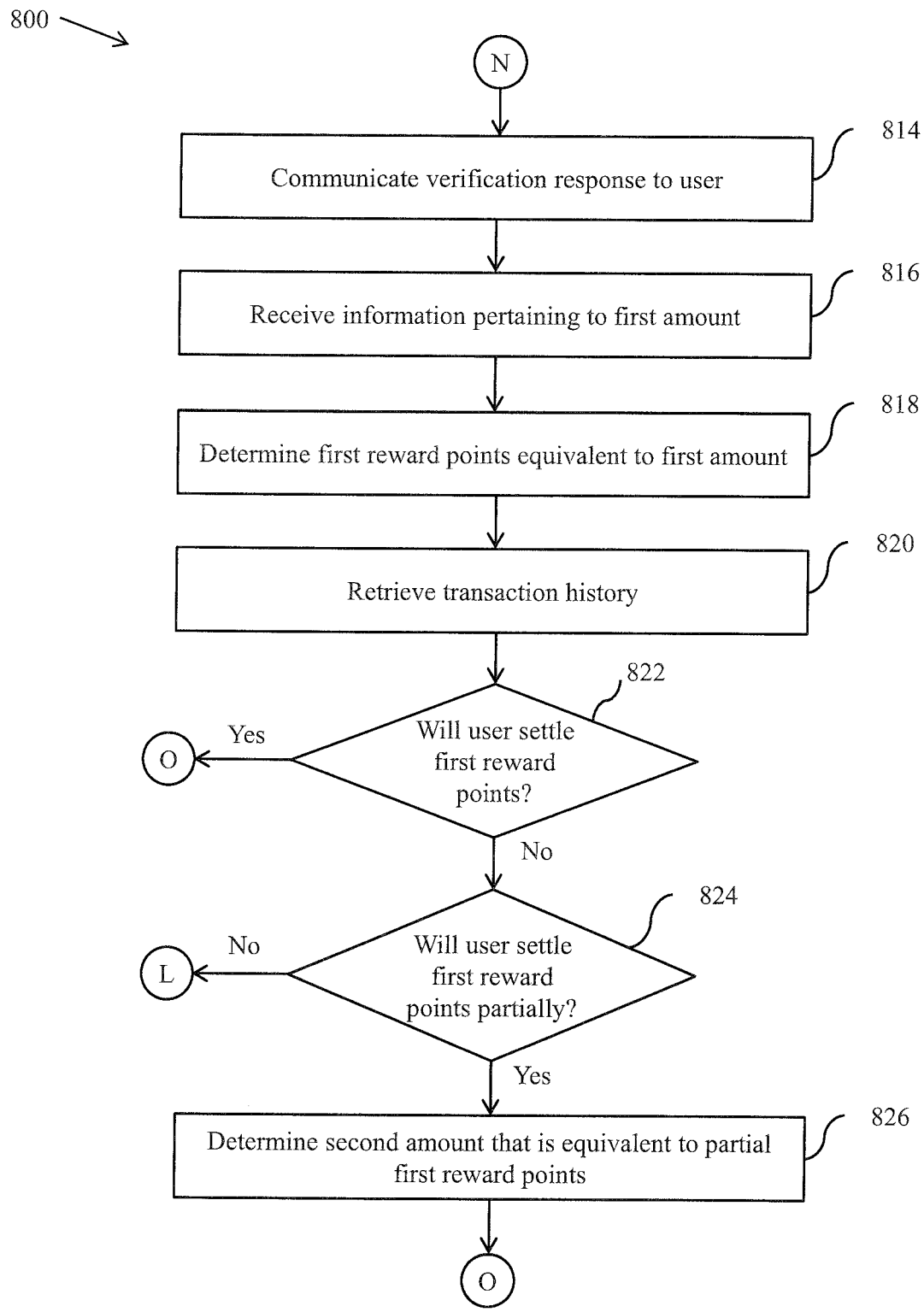
Figure 8C:
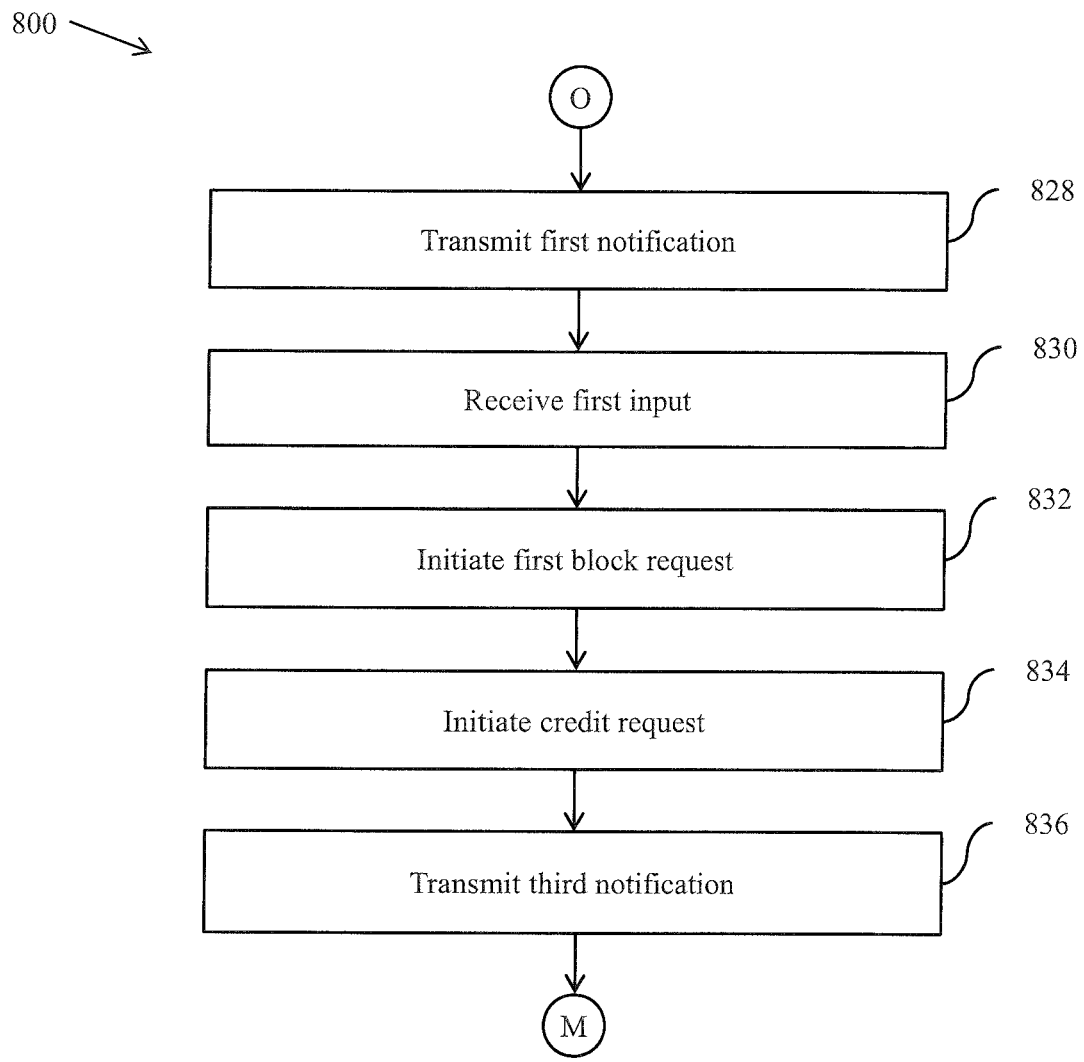

Referring now to FIGS. 8A-8C, a flow chart 800 that illustrates a method for crediting the account of the user 102, in accordance with another embodiment of the present invention, is shown. The flow chart 800 is read in conjunction with FIG. 5A. The user 102 accesses the mobile application or the webpage of the issuer server 106 to register the user account for a service that facilitates the maintenance of the minimum amount in the user account. For registering the user account, the user 102 provides the registration details through the mobile application or the webpage.

At step 802, the issuer server 106 receives the registration details by way of the registration request provided by the user 102. At step 804, the issuer server 106 initiates the verification of the transaction card/s based on the registration details. For the sake of simplicity, the present invention considers that the user 102 links a single transaction card with the user account. However, it is also possible for the user 102 to link multiple transaction cards without deviating from the scope and spirit of the present invention. At step 806, the issuer server 106 determines whether the user account is valid or invalid. If at step 806, the issuer server 106 determines that the user account is not valid, step 808 is performed. At step 808, the issuer server 106 transmits a denial of service notification to the user 102. However, if at step 806, the issuer server 106 determines that the user account is valid, step 810 is performed. At step 810, the issuer server 106 determines whether the transaction card has an associated cashback facility. If at step 810, the issuer server 106 determines that the transaction card does not have an associated cashback facility, step 808 is performed. However, if at step 810, the issuer server 106 determines that the transaction card has an associated cashback facility, step 812 is performed.

At step 812, the issuer server 106 generates the verification response. At step 814, the issuer server 106 communicates the verification response to the user 102. In one scenario, the verification response indicates if the user account is valid. In another scenario, the verification response may include the information pertaining to the first amount.

At step 816, the issuer server 106 receives the information pertaining to the first amount from the user 102 or an approval or denial to the first amount from the user 102. At step 818, the issuer server 106 determines the first reward points that are equivalent to the first amount. At step 820, the issuer server 106 retrieves the transaction history of the user 102 from the first memory 204. At step 822, the issuer server 106 determines whether the user 102 is likely to conduct as many transactions using the transaction card within the first time period for settling the first reward points. If at step 822, the issuer server 106 determines that the user 102 may not be able to conduct as many transactions to settle the first reward points, step 824 is performed. At step 824, the issuer server 106 determines whether the user 102 is likely to conduct as many transactions to settle the first reward points partially. If at step 824, the issuer server 106 determines that the user 102 may not conduct as many transactions to settle the first reward points partially, step 808 is performed. However, if at step 824, the issuer server 106 determines that the user 102 may conduct as many transactions to settle the first reward points partially, step 826 is performed. At step 826, the issuer server 106 determines the second amount that is equivalent to the partial first reward points that the user 102 is likely to settle and step 828 is performed. It will be apparent to a person skilled in the art that in this scenario the second amount is less than the first amount. If at step 822, the issuer server 106 determines that the user 102 is likely to conduct as many transactions to settle the first reward points, step 828 is performed.

At step 828, the issuer server 106 transmits the first notification to the user device 104. In one embodiment, the first notification includes information pertaining to the first amount and the first reward points. In another embodiment, the first notification includes information pertaining to the second amount and the partial first reward points. In response to the first notification, the user 102 provides the first input through the mobile application or the webpage of the issuer server 106.

At step 830, the issuer server 106 receives the first input from the user 102. At step 832, the issuer server 106 initiates the first block request to block one of the first reward points and the partial reward points for the first time period from the user account, when the user 102 agrees with the blocking of one of the first reward points and the partial reward points, respectively.

At step 834, the issuer server 106 initiates the credit request to credit one of the first and second amounts in the lock mode for the first time period in the user account.

At step 836, the issuer server 106 transmits the third notification to the user device 104. In one scenario, the third notification indicates the blocking of the first reward points and the crediting of the first amount in the lock mode for the first time period in the user account. The third notification further indicates the first time interval within which the user 102 is required to settle the predetermined points from the first reward points. In another scenario, the third notification indicates the blocking of the partial first reward points and the crediting of the second amount in the lock mode for the first time period in the user account. The third notification further indicates the first time interval within which the user 102 is required to settle the predetermined points from the partial first reward points. It will be apparent to a person skilled in the art that the functions performed by the issuer server 106 in FIGS. 8A-8C are performed by at least one of the authentication manager 310, the second transaction manager 312, and the second reward points manager 314 as explained in FIG. 5A.

Figure 9A:
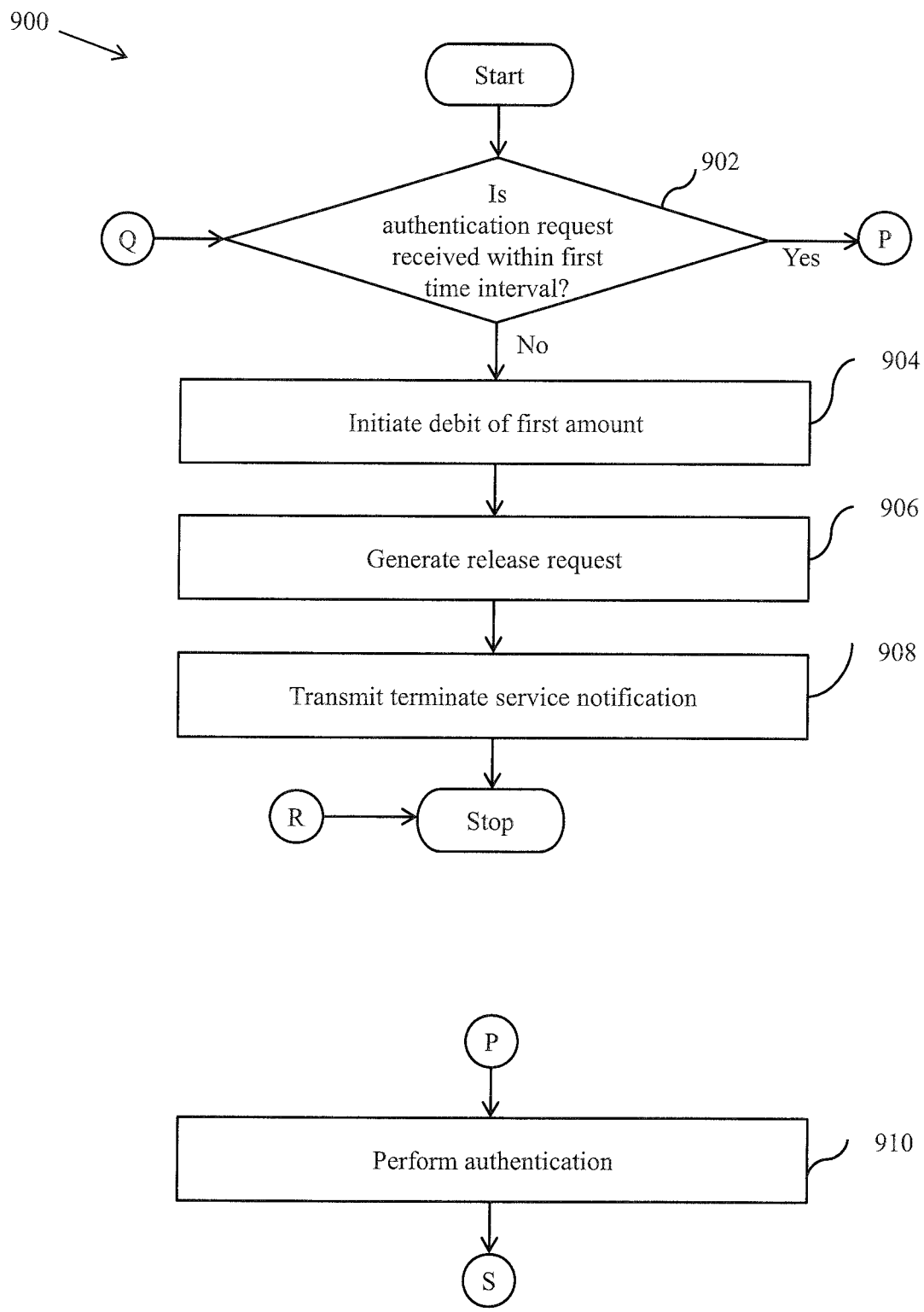
FIGS. 9A and 9B collectively represent a flow chart that illustrates a method for settling the first reward points from the account of the user, in accordance with another embodiment of the present invention.
Figure 9B:
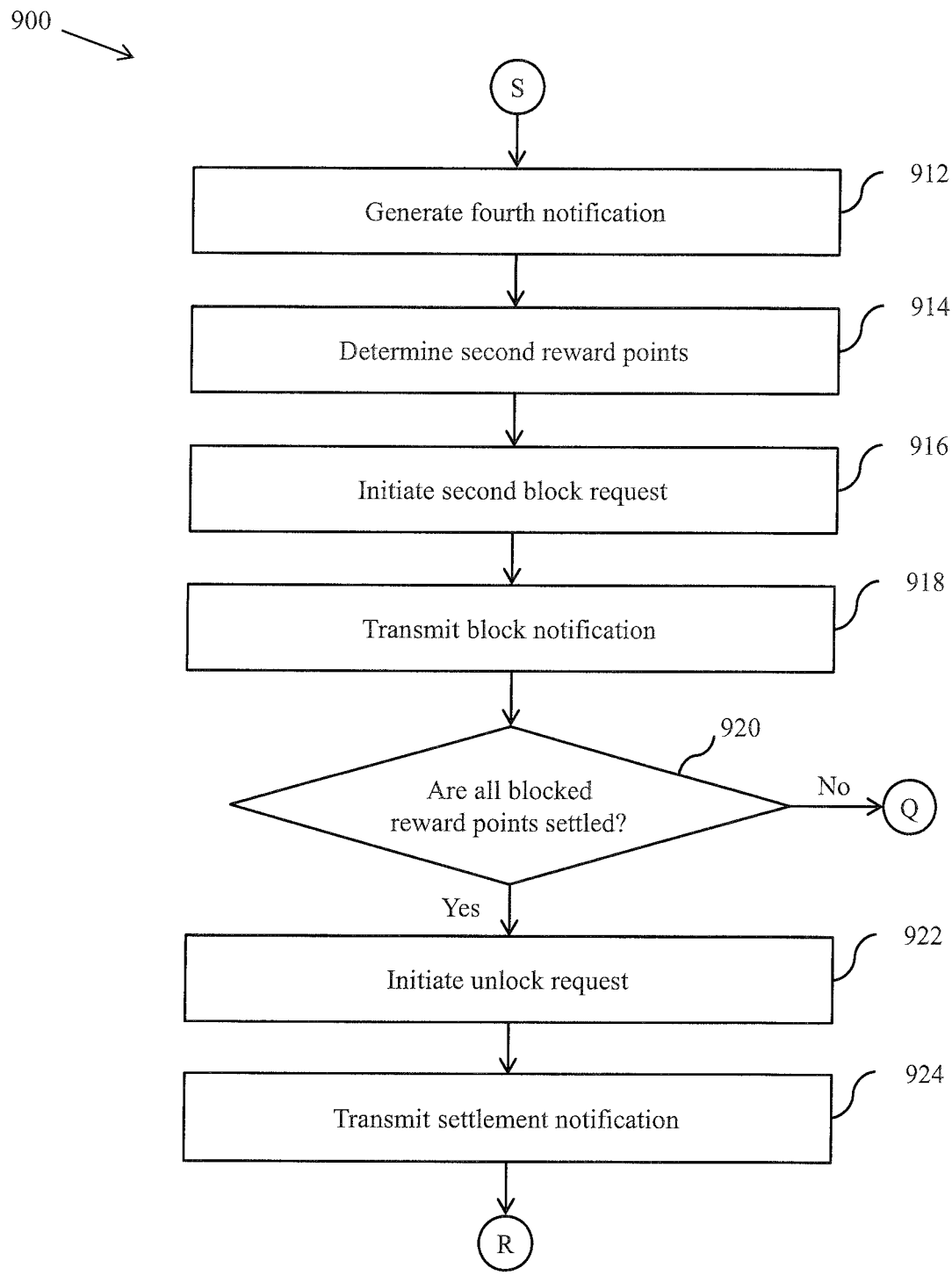

Referring now to FIGS. 9A and 9B, a flow chart 900 that illustrates a method for settling the first reward points from the account of the user 102, in accordance with another embodiment of the present invention, is shown. The flow chart 900 is read in conjunction with FIG. 5B. The issuer server 106 monitors the user account that is linked to the transaction card, which is registered with the issuer server 106 for the service that facilitates the maintenance of the minimum amount in the user account.

At step 902, the issuer server 106 determines whether any authentication request for a transaction from the user account is received within the first time interval from the payment network server 108. If at step 902, the issuer server 106 determines that no authentication request that corresponds to a transaction from the user account is received within the first time interval, step 904 is performed. At step 904, the issuer server 106 initiates the debit of the first amount from the user account as the user 102 has failed to settle the predetermined points from the first reward points within the first time interval. At step 906, the issuer server 106 generates the release request to unlock and debit the first amount from the user account and release the first amount to the issuer server 106. At step 908, the issuer server 106 transmits the terminate service notification to the user 102. The terminate service notification indicates that the service for maintaining the first amount in the user account is terminated.

However, if at step 902, the issuer server 106 determines that the authentication request that corresponds to a transaction from the user account is received from the payment network server 108, step 910 is performed. The payment network server 108 transmits the authentication request to the issuer server 106 when the payment network server 108 receives the authorization request from the acquirer server 110 within the first time interval, when the user 102 performs a transaction at a merchant. The payment network server 108 further authorizes the transaction based on the transaction card details in the authorization request. The merchant is associated with the merchant server 112 and has a bank account in the acquirer bank that is associated with the acquirer server 110. At step 910, the issuer server 106 performs the authentication of the user 102 and the user account based on the authentication request. At step 912, the issuer server 106 generates the fourth notification when the authentication of the user 102 is successful and debits a transaction amount associated with the transaction from the user account.

At step 914, the issuer server 106 determines the second reward points that are equivalent to the transaction amount of the transaction. At step 916, the issuer server 106 initiates the second block request. Based on the second block request, the issuer server 106 settles the second reward points from the first reward points and the difference of the first and second reward points (i.e., the third reward points) remain blocked until the user 102 performs other transactions by using the transaction card. At step 918, the issuer server 106 transmits the block notification to the user 102. The block notification indicates that the second reward points from the first reward points are settled and the user 102 is further required to settle the predetermined points from the third reward points within the first time interval.

At step 920, the issuer server 106 determines whether all blocked reward points associated with the user account are settled. If at step 920, the issuer server 106 determines that all blocked reward points associated with the user account are not settled, the issuer server 106 waits for the user 102 to perform another transaction in the next time interval and step 902 is performed. If at step 920, the issuer server 106 determines that all the blocked reward points associated with the user account are settled, step 922 is performed.

At step 922, the issuer server 106 initiates the unlock request for unlocking and debiting the first amount from the user account. Thus, the issuer server 106 unlocks and debits the first amount from the user account. At step 924, the issuer server 106 transmits the settlement notification to the user device 104. The settlement notification indicates that the first reward points are settled and are now unblocked. The issuer server 106 credits the user account with the amount that is equivalent to the first reward points that are settled. It will be apparent to a person skilled in the art that the functions performed by the issuer server 106 in FIGS. 9A and 9B are performed by at least one of the authentication manager 310, the second transaction manager 312, and the second reward points manager 314 as explained in FIG. 5B. In another embodiment, the issuer server 106 may execute the above-mentioned steps of FIGS. 9A and 9B for settling the partial first reward points that are blocked from the user account. It will further be apparent to a person skilled in the art that the functions performed by the payment network server 108 in FIGS. 9A and 9B are performed by at least one of the authorization manager 210, the first transaction manager 212, and the first reward points manager 214 as explained in FIG. 5B.

In an alternate embodiment, the service for maintaining the minimum amount in the user account may be implemented by an e-wallet in the same manner as described herein. In the embodiment, the account may be an e-wallet account or a bank account.

Figure 10:
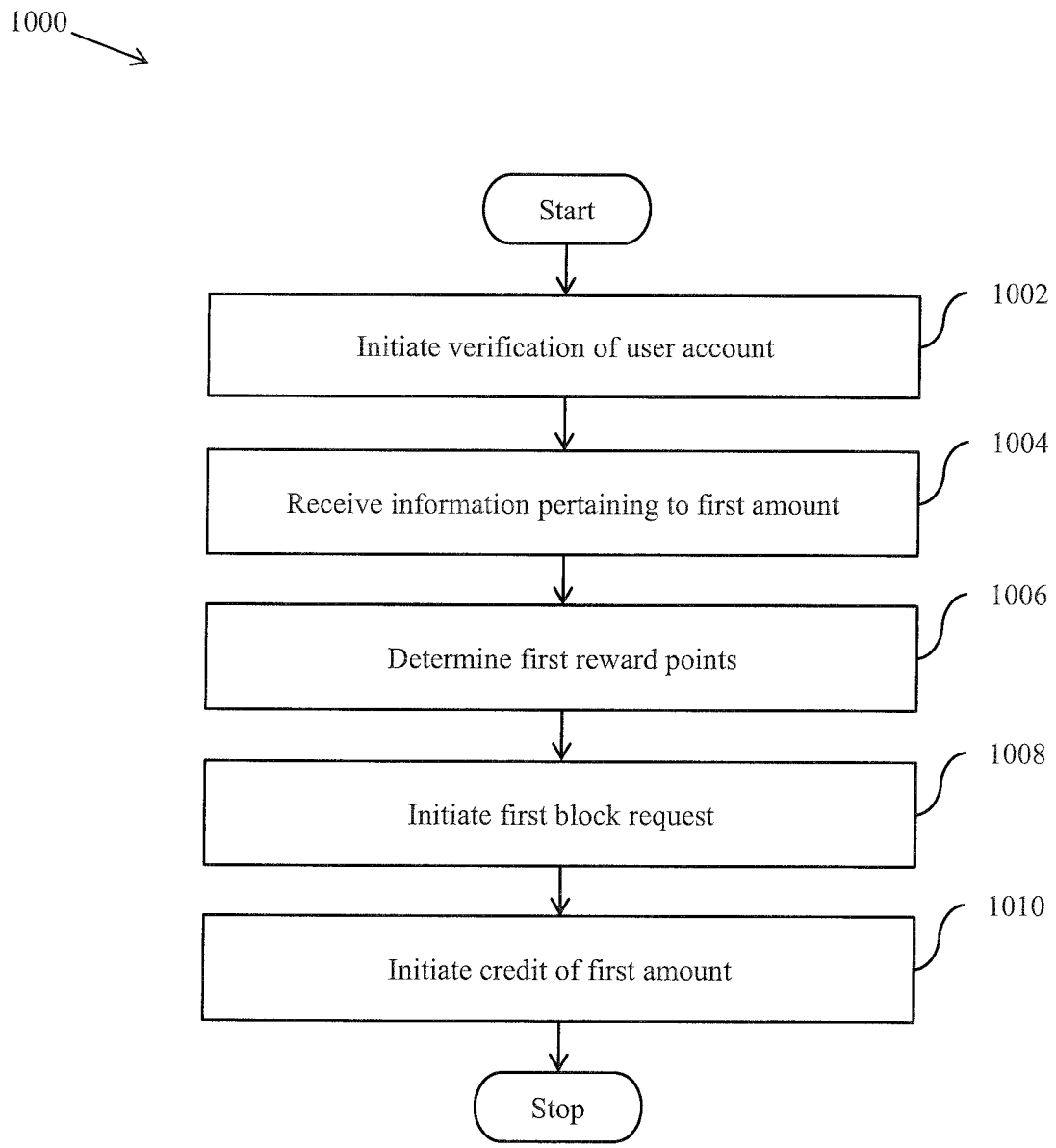
FIG. 10 is a high-level flow chart that illustrates a method for crediting the account of the user, in accordance with an embodiment of the present invention.

Referring now to FIG. 10, a high-level flow chart 1000 that illustrates a method for crediting the account of the user 102, in accordance with an embodiment of the present invention, is shown. The user 102 accesses the mobile application or the webpage of the payment network server 108 or the issuer server 106 to register for a service that facilitates the maintenance of the minimum amount in the user account. The user 102 raises the registration request to avail the service. The references made to a server hereinafter may refer to either of the issuer server 106 and payment network server 108. At step 1002, the server initiates the verification of the user account based on the registration request. At step 1004, the server receives the information pertaining to the first amount based on the verification of the user account. At step 1006, the server determines the first reward points associated with the user account, based on at least one of the first amount and the transaction card associated with the user account. At step 1008, the server initiates the first block request to block the first reward points from the user account. The blocked first reward points are settled against one or more reward points earned by the user 102 when the user 102 performs one or more transactions by way of the transaction card. At step 1010, the server initiates the credit of the first amount in the lock mode in the user account based on the first reward points. The first amount is credited in the user account for the first time period.

Figure 11:
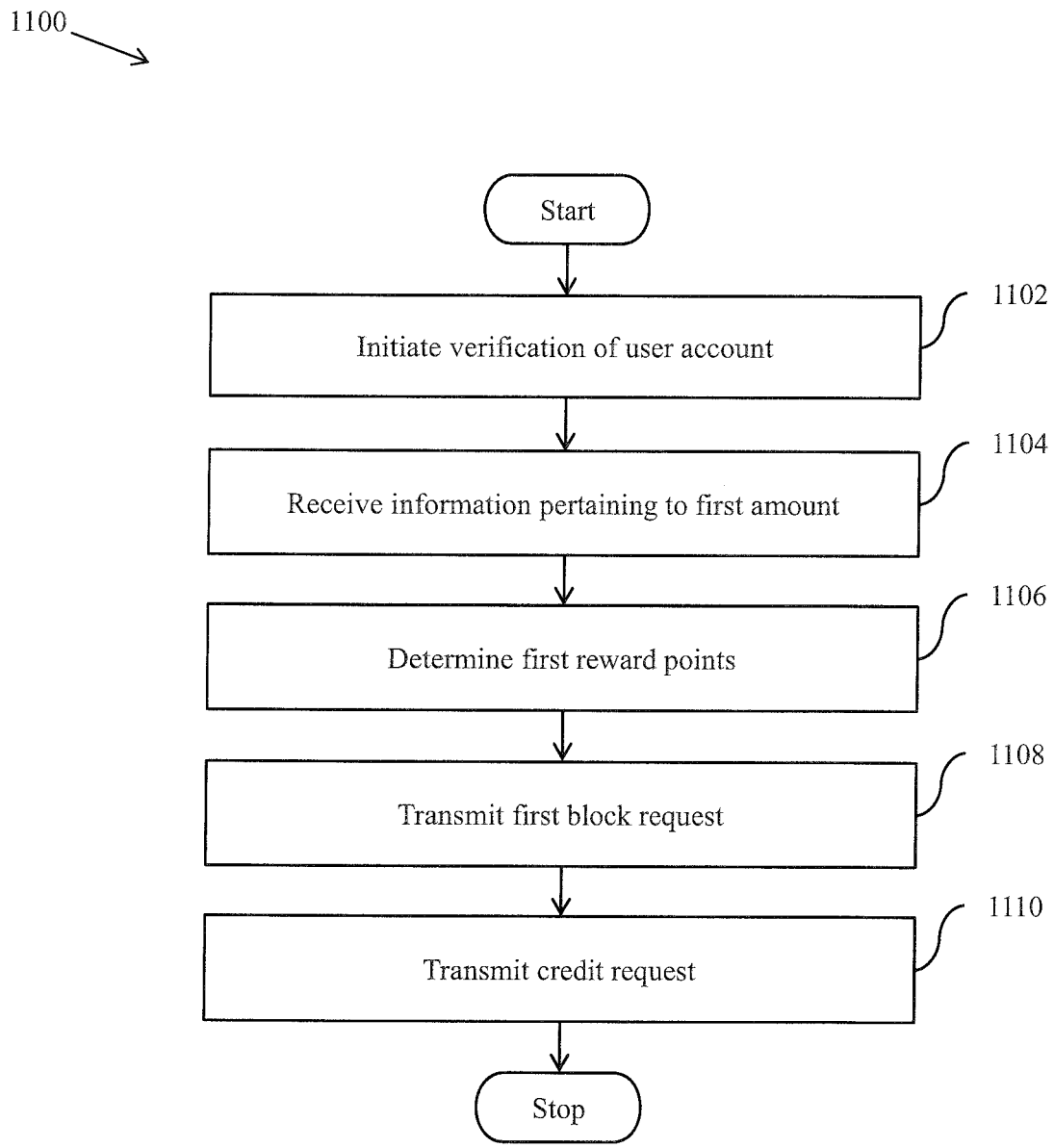
FIG. 11 is a high-level flow chart that illustrates a method for crediting the account of the user, in accordance with another embodiment of the present invention.

Referring now to FIG. 11, a high-level flow chart 1100 that illustrates a method for crediting the account of the user 102, in accordance with another embodiment of the present invention, is shown. The user 102 accesses the mobile application or the webpage of the payment network server 108 to register a transaction card for a service that facilitates the maintenance of the minimum amount in the user account. The user 102 raises the registration request to avail the service. At step 1102, the payment network server 108 initiates the verification of the user account based on the registration request. At step 1104, the payment network server 108 receives the information pertaining to the first amount based on the verification of the user account. At step 1106, the payment network server 108 determines the first reward points associated with the user account, based on at least one of the first amount and the transaction card associated with the user account. At step 1108, the payment network server 108 transmits the first block request to the issuer server 106 to block the first reward points from the user account. The blocked first reward points are settled against one or more reward points earned by the user 102 when the user 102 performs one or more transactions by way of the transaction card. At step 1110, the payment network server 108 transmits the credit request to the issuer server 106 to credit the first amount in the lock mode in the user account based on the first reward points. The first amount is credited in the user account for the first time period.

The method and system of the present invention eliminate the need for the users to remember and maintain the minimum amount in their financial accounts, thus providing a convenient mechanism to the users for maintaining the minimum amount. The invention is advantageous for users who have multiple bank accounts as they need to simply register transaction cards with the associated bank accounts and do not need to remember the maintenance of minimum amount in each of the bank accounts. Further, the users can utilize the service with their current bank accounts and do not need to opt for a different bank account. The method and system further offer a facility for users to maintain an amount that is less than the minimum amount in the lock mode for the first time period. The payment network or the issuer bank that credits the user account with the first amount in the lock mode further earns an interest on the first amount. Further, the payment network and issuer bank may have a mechanism to divide the interest based on the first amount. When the service for maintaining the minimum amount is terminated after the users settle all the reward points, the users can continue maintaining the minimum amount by creating another account with a different transaction card or using the same log-in details to log-in to the website or the mobile application. The method and system may also offer the service for maintaining the minimum amount for a first-time user by charging pre-determined fees.

Referring now to FIG. 12, a block diagram that illustrates a system architecture of a computer system 1200, in accordance with an embodiment of the present invention, is shown. An embodiment of present invention, or portions thereof, may be implemented as computer readable code on the computer system 1200. In one example, the user device 104, the issuer server 106, the payment network server 108, the acquirer server 110, and the merchant server 112 of FIG. 1 may be implemented in the computer system 1200 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6-11.

The computer system 1200 includes a main processor 1202 that may be a special purpose or a general-purpose processing device. The main processor 1202 may be a single processor, multiple processors, or combinations thereof. The main processor 1202 may have one or more processor "cores." In one example, the main processor 1202 is an octa-core processor. Further, the main processor 1202 may be connected to a communication infrastructure 1204, such as a bus, message queue, the first bus 208, the second bus 308, multi-core message-passing scheme, and the like. The computer system 1200 further includes a main memory 1206 and a secondary memory 1208. Examples of the main memory 1206 may include RAM, ROM, dynamic RAM (DRAM), and the like. The secondary memory 1208 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1200 further includes an input/output (I/O) interface 1210 and a communication interface 1212. The I/O interface 1210 includes various input and output devices that are configured to communicate with the main processor 1202. Examples of the input devices may include a keyboard, a mouse, a joystick, a touchscreen, a microphone, and the like. Examples, of the output devices may include a display screen, a speaker, headphones, and the like. The communication interface 1212 may allow data to be transferred between the computer system 1200 and various devices that are communicatively coupled to the computer system 1200. Examples of the communication interface 1212 may include a modem, a network interface, i.e., an Ethernet card, a communications port, and the like. Data transferred via the communication interface 1212 corresponds to signals, such as electronic, electromagnetic, optical, or other signals as will be apparent to a person skilled in the art. The signals may travel via a communication channel (not shown) which transmits the signals to devices that are communicatively coupled to the computer system 1200. Examples of the communication channel include, but are not limited to, a cable, fiber optics, a phone line, a cellular phone link, or a radio frequency link.

Computer program medium and computer usable medium may refer to a non-transitory computer readable medium, such as the main memory 1206 and the secondary memory 1208, which may be a semiconductor memory such as a DRAM. The computer program medium may provide data that enables the computer system 1200 to implement the methods illustrated in FIGS. 6-11. In an embodiment, the present invention is implemented using a computer implemented application, the computer implemented application may be stored in a computer program product and loaded into the computer system 1200 using the removable storage drive or the hard disc drive in the secondary memory 1208, the I/O interface 1210, or the communication interface 1212.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the main processor 1202 and a memory such as the main memory 1206 and the secondary memory 1208 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for crediting a user account. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for controlling data, the data comprising a monetary amount in a user account, the monetary amount representing a minimum amount that a user is required to maintain in the user account, the method comprising:

using a communication interface, initiating by a payment network server, via a transceiver that uses a communication network based on a defined communication protocol, a verification of the user account of a user based on a registration request received from the user, the user account being associated with an issuer bank, the registration request including a request for registering with a service provided by the payment network server;

receiving, from an issuer server associated with the issuer bank, by the payment network server, information pertaining to the monetary amount based on the verification of the user account;

retrieving from a cloud storage, by the payment network server, transaction history of the user associated with a transaction card associated with the user account, the transaction card being, a virtual card stored in a memory of a device of the user;

based on the retrieved transaction history from the cloud storage, determining, by the payment network server, reward points associated with the user account, which are equivalent to the monetary amount;

based on the retrieved transaction history from the cloud storage, determining, by the payment network server, that the user is likely to conduct a number of transactions within a defined time period, using the transaction card, that are required for settling the reward points;

initiating, by the payment network server, a request to credit the reward points in the user account in a blocked state, wherein the reward points are settled against one or more reward points earned by the user as the user performs one or more transactions using the transaction card;

initiating, by the payment network server, a credit of the monetary amount in the user account in a lock mode, making the monetary amount unavailable to the user for use, while providing the minimum amount in the user account based on the reward points, wherein the monetary amount is credited in the user account, in the locked mode, for the defined time period;

determining that the user has not settled all the reward points within the defined time period; and transmitting a notification to terminate the service to the user indicating that the service has been terminated.

2. The method of claim 1, wherein the verification of the user account of a user based on a registration request includes determining that the transaction card does not have an associated cashback facility and transmitting a denial notification indication that the transaction card is invalid for crediting the reward points in the user account based on the determination.

3. The method of claim 1, wherein the notification comprises a push notification presented to the user through a mobile application on a user device of the user.

4. The method of claim 1, further comprising:
determining, by the payment network server, second reward points, which are earned by the user, based on a transaction performed by the user using the transaction card; and initiating, by the payment network server, a second request to block third reward points, that represent a difference of the reward points and the second reward points, in the user account as the second reward points are settled in the user account based on the performed transaction, thereby maintaining third reward points in a blocked state in the user account.

5. The method of claim 1, wherein the communication network is a combination of a light fidelity network, a fiber optic network, and a satellite network.

6. The method of claim 1, further comprising:
determining, by the payment network server, whether the user settles predetermined reward points of the reward points within a first time interval of the defined time period; and initiating, by the payment network server, a debit of the monetary amount from the user account when the user fails to settle the predetermined reward points within the first time interval.

7. The method of claim 1, further comprising:
receiving, by the payment network server, a first input from the user, wherein the first input indicates one of an acceptance and a decline from the user to block the reward points, and wherein the payment network server initiates a block request based on the first input.

8. A system for controlling data, the data comprising a monetary amount in a user account, the monetary amount representing a minimum amount that a user is required to maintain in the user account, the system comprising:
a payment network server comprising:
a processor configured to:
using a communication interface, initiate, via a transceiver that uses a communication network based on one defined communication protocol, a verification of the user account of a user based on a registration request received from the user, the user account being associated with an issuer bank;

receive from an issuer server associated with the issuer bank, information pertaining to the monetary amount based on the verification of the user account;

retrieve from a cloud storage, transaction history of the user associated with a transaction card associated with the user account, the transaction card being a virtual card stored in a memory of a device of the user;

based on the retrieved transaction history from the cloud storage, determine first reward points associated with the user account, which are equivalent to the monetary amount;

based on the retrieved transaction history from the cloud storage, determine whether the user is likely to conduct a number of transactions within a defined time period, using the transaction card, that are required for settling the first reward points;

based on determining that the user is likely to conduct the number of transactions required for settling the first reward points within the defined time period, initiate a request to credit the first reward points in the user account in a blocked state, wherein the first reward points are settled against a plurality of reward points earned by the user as the user performs a plurality of transactions using the transaction card;

initiate a credit of the monetary amount in the user account in a lock mode, making the monetary amount unavailable to the user for use, while providing the minimum amount in the user account based on the first reward points, wherein the monetary amount is credited in the user account, in the locked mode, for the defined time period;

based on determining that the user has performed a first transaction of the plurality of transactions within the defined time period, release second reward points in the user account, while keeping third reward points that are equal to a difference between the first reward points and second reward points in the blocked state:

based on determining that the user has performed a second transaction of the plurality of transactions within the defined time period, release third reward points in the user account, causing no reward points to be left in the user account in the blocked state:

based on the user settling the first reward points within the defined time period, credit the user account with an amount equivalent to the first reward points and receive the monetary amount by the payment network server.

9. The system of claim 8, wherein the defined time period comprises a first time interval and a second time interval and the user is required to settle a defined subset of the reward points in the first time interval and rest of the reward points in the second time interval.

10. The system of claim 8, wherein the verification of the user account of the user based on a registration request includes determining that the transaction card does not have an associated cashback facility and transmitting a denial notification indication that the transaction card is invalid for crediting the reward points in the user account based on the determination.

11. The system of claim 10, wherein the notification comprises a push notification presented to the user through a mobile application on a user device of the user.

12. The system of claim 8, wherein the credit of the monetary amount in a lock mode is initiated upon the user accepting a blocking of the reward points and crediting of the monetary amount in a lock mode in the user account.

13. The system of claim 8, wherein the processor is further configured to:
determine whether the user settles predetermined reward points of the reward points within a first time interval; and
initiate a debit of the monetary amount from the user account when the user fails to settle the predetermined reward points within the first time interval.

14. The system of claim 8, wherein the processor is further configured to:
receive a first input from the user, wherein the first input indicates one of an acceptance and a decline from the user to block the reward points, and wherein the processor initiates a block request based on the first input.

15. A non-transitory computer readable medium storing program instructions for controlling data, the data comprising a monetary amount in a user account, the monetary amount representing a minimum amount that a user is required to maintain in the user account, wherein the instructions, when executed by a processor of a computer system, cause the computer system to perform:
using a communication interface, initiate, via a transceiver that uses a communication network based on a defined communication protocol, a verification of the user account of a user based on a registration request received from the user, the user account being associated with an issuer bank, the registration request including a request for registering with a service provided by a payment network server;
receive from an issuer server associated with the issuer bank, information pertaining to the monetary amount based on the verification of the user account;
retrieve from a cloud storage, transaction history of the user associated with a transaction card associated with the user account, the transaction card being a virtual card stored in a memory of a device of the user;
based on the retrieved transaction history from the cloud storage, determine reward points associated with the user account, which are equivalent to the monetary amount;
based on the retrieved transaction history from the cloud storage, determine that the user is likely to conduct a number of transactions within a defined time period, using the transaction card, that are required for settling the reward points;
transmit to the issuer server, a request to credit the reward points in the user account in a blocked state, wherein the reward points are settled against one or more reward points earned by the user as the user performs one or more transactions using the transaction card,
transmit a request to credit the monetary amount in the user account in a lock mode, making the monetary amount unavailable to the user for use, while providing the minimum amount in the user account based on the reward points, wherein the monetary amount is credited in the user account for the defined time period;
determine that the user has not settled all the reward points within the defined time period; and
transmit a notification to terminate the service to the user indicating that the service has been terminated.

16. The non-transitory computer readable medium of claim 15, wherein the communication network is a combination of a light fidelity network, a fiber optic network, and a satellite network.

17. The non-transitory computer readable medium of claim 15, wherein the instructions, when executed by the processor of the computer system, cause the computer system to further perform:
determine second reward points, which are earned by the user, based on a transaction performed by the user using the transaction card; and
transmit a second request to block third reward points, that represent a difference of the reward points and the second reward points from the user account as the second reward points are settled in the user account based on the performed transaction, thereby maintaining third reward points in a blocked state in the user account.

18. The non-transitory computer readable medium of claim 15, wherein the verification of the user account of the user based on a registration request includes determining that the transaction card does not have an associated cashback facility and transmitting a denial notification indication that the transaction card is invalid for crediting the reward points in the user account based on the determination.

19. The non-transitory computer readable medium of claim 15, wherein the instructions, when executed by the processor of the computer system, cause the computer system to further perform:
determine whether the user settles predetermined points of the reward points within a first time interval of the defined time period; and
transmit a debit request to debit the monetary amount from the user account when the user fails to settle the predetermined points within the first time interval.

20. The non-transitory computer readable medium of claim 15, wherein the instructions, when executed by the processor of the computer system, cause the computer system to further perform:
receive, a first input from the user, wherein the first input indicates one of an acceptance and a decline from the user to block the reward points, and wherein a block request is transmitted based on the first input.

* * * * *